US010325705B2

(12) United States Patent
Kawashita et al.

(10) Patent No.: US 10,325,705 B2
(45) Date of Patent: Jun. 18, 2019

(54) MAGNET PARTICLES AND MAGNET MOLDING USING SAME

(71) Applicant: Nissan Motor Co., Ltd., Yokohama-shi, Kanagawa (JP)

(72) Inventors: Yoshio Kawashita, Kanagawa (JP); Masaya Arai, Kanagawa (JP); Ryou Murakami, Kanagawa (JP); Shinichirou Fujikawa, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 15/750,238

(22) PCT Filed: Aug. 24, 2015

(86) PCT No.: PCT/JP2015/073762

§ 371 (c)(1),
(2) Date: Feb. 5, 2018

(87) PCT Pub. No.: WO2017/033266

PCT Pub. Date: Mar. 2, 2017

(65) Prior Publication Data

US 2018/0226180 A1 Aug. 9, 2018

(51) Int. Cl.

| | |
|---|---|
| ***B32B 5/16*** | (2006.01) |
| ***H01F 1/053*** | (2006.01) |
| ***H01F 1/09*** | (2006.01) |
| ***B22F 1/00*** | (2006.01) |
| ***B22F 3/14*** | (2006.01) |

(Continued)

(52) U.S. Cl.

CPC .......... *H01F 1/0533* (2013.01); *B22F 1/0062* (2013.01); *B22F 1/0085* (2013.01);
(Continued)

(58) Field of Classification Search

CPC .... B32B 5/16; B22F 1/0059; Y10T 428/1121; Y10T 428/2991
USPC .......................................................... 428/403
See application file for complete search history.

(56) References Cited

U.S. PATENT DOCUMENTS 3,421,889 A * 1/1969 Strnat ..................... C22C 19/07 148/301
6,139,766 A * 10/2000 Taguchi ............. C04B 35/2641 252/62.57

(Continued)

FOREIGN PATENT DOCUMENTS

| | | |
|---|---|---|
| CN | 1225728 A | 8/1999 |
| EP | 0907112 A1 | 4/1999 |

(Continued)

OTHER PUBLICATIONS

Translation copy of JP 2009-035769 (Year: 2009).*

(Continued)

*Primary Examiner* — Hoa (Holly) Le
(74) *Attorney, Agent, or Firm* — Global IP Counselors, LLP

(57) ABSTRACT

A bond magnet molding is provided that contains coated magnetic particles having at least two layers of an oxide layer of 1-20 nm on a surface of magnetic particles and an organic layer of 1-100 nm on an outer side of the oxide layer. The bond magnet molding preferably includes a Zn alloy as a binder. The Zn alloy has a strain rate sensitivity exponent (m value) of not less than 0.3 and an elongation at break of not less than 50%. The magnet particles have a nitrogen compound containing Sm and Fe that are solidified using the binder at a temperature not higher than a molding temperature.

13 Claims, 10 Drawing Sheets

(51) Int. Cl.

| | |
|---|---|
| ***H01F 1/059*** | (2006.01) |
| ***H01F 41/02*** | (2006.01) |
| ***H01F 1/08*** | (2006.01) |
| ***B22F 1/02*** | (2006.01) |

(52) U.S. Cl.

CPC .............. *B22F 1/0088* (2013.01); *B22F 1/02* (2013.01); *B22F 3/14* (2013.01); *H01F 1/059* (2013.01); *H01F 1/083* (2013.01); *H01F 1/09* (2013.01); *H01F 41/0266* (2013.01); *B22F 2301/45* (2013.01)

(56) References Cited

U.S. PATENT DOCUMENTS

| | | | | |
|---|---|---|---|---|
| 2008/0152916 | A1* | 6/2008 | Guschl .................. | H01F 1/0572 428/407 |
| 2010/0015472 | A1 | 1/2010 | Bradshaw et al. | |

FOREIGN PATENT DOCUMENTS

| | | | |
|---|---|---|---|
| JP | 6-77027 | A | 3/1994 |
| JP | 2001-160508 | A | 6/2001 |
| JP | 2001-176711 | A | 6/2001 |
| JP | 2009-35769 | A | 2/2009 |
| JP | 4650593 | B2 | 12/2010 |
| JP | 2015-8231 | A | 1/2015 |
| WO | 2010/071111 | A1 | 6/2010 |

OTHER PUBLICATIONS

Qin & He, Research on Composite Powder and Magnet Properties of Bonded NdFeB Magnets Prepared by Press Molding, Applied Mechanics and Materials, vol. 345, pp. 218-222 (Year: 2013).*

Wang et al., Evolution of binary Fe2O3/SiO2 coating layers on the surfaces of aluminum flakes and the pigmentary performances, Powder Technology 221 (2012) 306-311. (Year: 2012).*

* cited by examiner (A)

(B)

REFLECTED ELECTRON IMAGE

DENSIFIED REGION (Zn REACTION PHASE

MAGNET PARTICLES AND MAGNET MOLDING USING SAME

CROSS-REFERENCE TO RELATED APPLICATIONS

This application is a U.S. National stage application of International Application No. PCT/JP2015/073762, filed Aug. 24, 2015.

BACKGROUND

Field of the Invention

The present invention relates to magnet particles and a magnet molding using same.

Background Information

A rare earth magnet containing a rare earth element and a transition metal has both high magneto crystalline anisotropy and high saturation magnetization, and thus shows promise for various applications as a permanent magnet. Among rare earth magnets, it is known that rare earth-transition metal-nitrogen-based magnets, typified by Sm—Fe—N based magnets, exhibit excellent magnetic properties without using costly raw materials.

In addition, there are two main types of rare earth magnets that are currently used, sintered magnets and bond magnets. Of these, bond magnets are used by solidifying magnetic powder, having excellent magnetic properties, with resin at room temperature.

Rare earth-transition metal-nitrogen-based magnets, typified by Sm—Fe—N based magnets, show promise as permanent magnets, but have the disadvantage of lacking thermal stability. When a rare earth-transition metal-nitrogen-based magnet is heated to 600° C. or more, the magnet decomposes into rare earth nitrides and transition metals; therefore, it is not possible to produce a magnet molding by the sintering method as with the conventional powder metallurgy method. Therefore, rare earth-transition metal-nitrogen-based magnets have been used as bond magnets, but in this case, since the volume of organic matter (resin) as binder occupies about 30% of the whole, sufficient magnetic force cannot be obtained.

Therefore, in the production of bond magnets for those rare earth magnets that contain a rare earth element and a transition metal, a method of solidification molding is in demand whereby it is possible to obtain a magnet molding that does not contain substances other than the magnetic powder, to the greatest possible extent, without solidifying with an organic substance (binder). As such a solidification molding method, molding processes such as explosion bonding by explosion of an explosive, and HIP (hot isostatic pressing), are known. Of these, HIP (hot isostatic pressing) is associated with poor productivity.

Consequently, as such a solidification molding method, the powder impact molding method using an explosive disclosed in Japanese Laid-Open Patent Application No. Hei 6(1994)-77027 (Patent Document 1) has been evaluated to date.

SUMMARY

However, in a solidification molding method such as the powder impact molding method of Patent Document 1, etc., the residual magnetization (Br) is improved by solidification at a high density, but there is the problem that the coercive force (Hc) is reduced. This is because, while the coercive force exhibits favorable performance when the magnetic particles have a small particle size and behave as independent particles, when the particle density is increased, the particles short-circuit and take on the approximate behavior of coarse particles, or are subject to the interference of the magnetic force of nearby particles, and sufficient characteristics cannot be exhibited.

In order to solve the problems of the prior art described above, an object of the present invention is to provide magnetic particles capable of suppressing binding between magnetic particles even when formed at a high density without being solidified by an organic substance (binder), and a bond magnet molding using same.

The present inventors carried out extensive research in order to solve the problems described above. As a result, the object of the present invention can be achieved by magnetic particles characterized by comprising an oxide layer of 1-20 nm on the particle surface, and a coating of two or more organic layers of 1-100 nm on the outer side of the oxide layer.

In addition, another object of the present invention can be achieved by a metal bond magnet molding characterized by being produced by molding using the magnetic particles described above.

DETAILED DESCRIPTION OF THE EMBODIMENTS

Figure 1A:
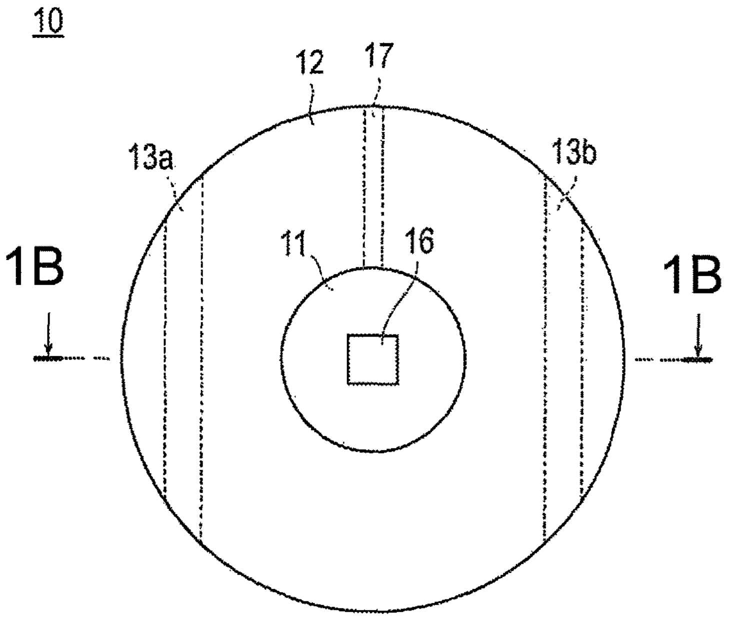
FIG. 1A is a schematic view illustrating a preferred example of a molding die.

Embodiments to carry out the present invention will be described in detail below. Hereinbelow, magnetic particles including the coatings of an oxide layer and an organic layer on the surface of the magnetic particles are referred to as "coated magnetic particles," and the particles, excluding the coatings of the oxide layer and the organic layer on the surface, are referred to as "magnetic particles" (also referred to as the core particles or core portions), so as not to be confused with each other. However, when it can be understood from the preceding and following sentences (semantic content) which meaning is being used, the coated magnetic particles or the magnetic particles, there are cases in which the phrase "magnetic particles" is used without distinguishing between the two. The coated magnetic particles of the present embodiment will be described below.

First Embodiment (I) Coated Magnetic Particles

The first embodiment of the present invention relates to coated magnetic particles characterized by comprising two or more layers of an oxide layer with a film thickness of 1-20 nm on the (single-crystal magnetic particle) surface, and an organic layer with a film thickness of 1-100 nm on the outer side of the oxide layer. In the present embodiment, since the raw material powder (magnetic particles) consists of coated magnetic particles, on the surface of which are formed two or more layers of an oxide layer of equal to or less than 1-20 nm and an organic layer of 1-100 nm formed on the outer side thereof, it is possible to suppress the binding between the magnetic particles (core portions) even when formed in a high density. The reason for using two or more layers is because suitable organic layers may be provided for the purpose of increasing the fluidity of the outermost layer, suppressing oxidation, reducing frictional resistance, and improving orientation, by providing two or more organic layers and making the lower layer side an organic layer of a lubricant component.

(1) Magnetic Particles (Core Particles or Core Portions)

The magnetic particles are not particularly limited, as long as the magnetic particles are being used as raw material powder of a bond magnet molding, from among rare earth magnets containing a rare earth element and a transition metal. The composition of the magnetic particles (the compound constituting the magnetic particles) preferably has the composition of an R-M-X alloy (R-M-X compound). Here, R stands for a rare earth element containing at least one of Sm and Nd, M for a transition metal element containing at least one of Fe and Co, and X for a non-metal element containing at least one of N and B. That is, examples of the composition of the magnetic particles (the compound constituting the magnetic particles) include those containing compositions such as Sm—Fe—N based alloy, Sm-—Fe—B based alloy, Sm—Co—N based alloy, Sm—Co—B based alloy, Nd—Fe—N based alloy, Nd—Fe—B based alloy, Nd—Co—N based alloy, and Nd—Co—B based alloy. Specific examples include compounds such as $Sm_2Fe_{14}B$, $Sm_2C0_{14}B$, $Sm_2$ $(Fe_{1-x}Co_x)_{14}B$ (here, x is preferably 0≤x≤0.5, $Sm_{15}Fe_{77}B_5$, $Sm_{15}Co_{77}B_5$, $Sm_{11.77}Fe_{82.35}B_{5.88}$, $Sm_{11.77}Fe_{82.35}B_{5.88}$, $Sm_{11.77}Co_{082.35}B_{5.88}$, $Sm_{1.1}Fe_4B_4$, $Sm_{1.1}Co_4B_4$, $Sm_7Fe_3B_{10}$, $Sm_7Co_3B_{10}$, $(Sm_{1-x}Dy_x)_{15}Fe_{77}B_8$ (here, x is preferably 0≤x≤0.4), $(Sm_{1-x}Dy_x)_{15}Co_{77}B_8$ (here, x is preferably 0≤x≤0.4), $Sm_2Fe_{17}N_x$ (here, x is preferably 1-6, more preferably $_{1.1}$-5, still more preferably 1.2-3.8, particularly preferably 1.7-3.3, where 2.2-3.1 is most preferable), $Sm_2Fe_{17}N_3$, $Sm_2Co_{17}N_x$ (here, x is preferably 1-6), $(Sm_{0.75}Zr_{0.25})$ $(Fe_{0.7}Co_{0.3})$ $N_x$ (here, x is preferably 1-6), $Sm_{15}$ $(Fe_{1-x}Co_x)_{77}B_7AI_1$, $Sm_{15}$ $(Fe_{0.80}Co_{0.20})_{77-y}B_8AI_y$ (here, y is preferably 0≤y≤5), $(Sm_{0.95}Dy_{0.05})_{15}$ $Fe_{77.5}B_7AI_{0.5}$, $(Sm_{0.95}Dy_{0.05})_{15}(Fe_{0.95}Co_{0.05})_{77.5}$ $B_{6.5}AI_{0.5}Cu_{0.2}$, $SmFe_{11}TiN_x$ (here, x is preferably 1-6), $(Sm_8Zr_3Fe_{84})_{85}N_{15}$, $Sm_4Fe_{80}B_{20}$, $Sm_{4.5}F$ $e_{73}Co_3GaB_{18.5}$, $Sm_{5.5}Fe_{66}Cr_5Co_5B_{18.5}$, $Sm_{10}Fe_{74}Co_{10}SiB_5$, $Sm_7Fe_{93}N_x$ (here, x is preferably 1-20), $Sm_{3.5}Fe_{78}B_{18.5}$, $Sm_4Fe_{76.5}B_{18.5}$, $Sm_4Fe_{77.5}B_{18.5}$, $Sm_{4.5}Fe_{77}B_{18.5}$, $Sm_{3.5}DyFe_{73}Co_3GaB_{18.5}$, $Sm_{4.5}Fe_{72}Cr_2Co_3B_{18.5}$, $Sm_{4.5}Fe_{73}$ $V_3SiB_{18.5}$, $Sm_{4.5}Fe_{71}Cr_3Co_3B_{18.5}$, $Sm_{5.5}Fe_{66}Cr_5Co_5B_{18.5}$, $Nd_2Fe_{14}B$, $Nd_2Co_{14}B$, $Nd_2$ $(Fe_{1-x}\text{-}Co_x)_{14}B$ (here, x is preferably 0≤x≤0.5), $Nd_{15}Fe_{77}B_5$, $Nd_{15}Co_{77}B_5$, $Nd_{11.77}Fe_{82.35}B_{5.88}$, $Nd_{11.77}Co_{82.35}B_{5.88}$, $Nd_{1.1}Fe_4B_4$, $Nd_{1.1}Co_4B_4$, $Nd_7Fe_3B_{10}$, $Nd_7Co_3B_{10}$, $(Nd_{1-x}Dy_x)_{15}Fe_{77}B_8$ (here, y is preferably 0≤y≤0.4), $(Nd_{1-x}Dy_x)_{15}Co_{77}B_8$ (here, y is preferably 0≤y≤0.4), $Nd_2Fe_{17}N_x$ (here, x is preferably 1-6, more preferably 1.1-5, still more preferably 1.2-3.8, particularly preferably 1.7-3.3, where 2.2-3.1 is most preferable), $Nd_2Co_{17}N_x$ (here, x is preferably 1-6),$(Nd_{0.75}Zr_{0.25})$ $(Fe_{0.7}Co_{0.3})$ N, (here, x is preferably 1-6), $Nd_2Fe_{17}N_3$, $Nd_{15}$ $(Fe_{1-x}Co_x)_{77}B_7AI_1$, $Nd_{15}$ $(Fe_{0.80}Co_{0.20})$ $_{77-y}B_8AI_y$ (here, y is preferably 0≤y≤5), (Nd $_{0.95}Dy_{0.05})_{15}Fe_{77.5}B_7AI_{0.5}$, $(Nd_{0.95}Dy_{0.05})_{15}(Fe_{0.95}Co_{0.05})_{77.5}B_{6.5}AI_{0.5}Cu_{0.2}$, $NdFe_{11}TiN_x$ (here, x is preferably 1-6), $(Nd_8Zr_3Fe_{84})_{85}N_{15}$, $Nd_4Fe_{80}B_{20}$, $Nd_{4.5}Fe_{73}CoGaB_{18.5}$, $Nd_{5.5}Fe_{66}Cr_5Co_5B_{18.5}$, $Nd_{10}Fe_{74}Co_{10}SiB_5$, $Nd_7Fe_{93}N_x$ (here, x is preferably 1-20), $Nd_{3.5}Fe_{78}B_{18.5}$, $Nd_4Fe_{76.5}B_{18.5}$, $Nd_4Fe_{77.5}B_{18.5}$, $Nd_{4.5}Fe_{77}B_{18.5}$, $Nd_{3.5}DYFe_{73}Co_3GaB_{18.5}$, $Nd_{4.5}Fe_{72}Cr_2Co_3B_{18.5}$, $Nd_{4.5}Fe_{73}V_3SiB_{18.5}$, $Nd_{4.5}Fe_{71}Cr_3Co_3B_{18.5}$, $Nd_{5.5}Fe_{66}Cr_5Co_5B_{18.5}$, but no limitation is imposed thereby at all. The composition of the magnetic particles (the compound constituting the magnetic particles) may have one type of the above-described R-M-X alloy (R-M-X compound) alone, or contain two or more types thereof. In addition, it is sufficient if, in the R-M-X alloy (R-M-X compound), R contains at least one of Sm and Nd, M contains at least one of Fe and Co, and X contains at least one of N and B, and those containing other elements are also included in the technical scope of the present invention. Examples of other elements that may be contained include Ga, Al, Zr, Ti, Cr, V, Mo, W, Si, Re, Cu, Zn, Ca, Mn, Ni, C, La, Ce, Pr, Pm, Eu, Gd, Tb, Dy, Ho, Er, Tm, Yb, Lu, Y, Th, MM and the like, but no limitation is imposed thereby. These may be added individually, or two types or more may be added in combination. These elements are mainly introduced by substituting a portion of the phase structure of the (rare earth magnet phase of the) magnetic particles represented by R-M-X, or by insertion, or the like.

The composition of the magnetic particles (the compound constituting the magnetic particles) preferably has, as the main component, a nitrogen compound containing Sm and Fe (also referred to as Sm—Fe—N based alloy or Sm—Fe—N compound), and more preferably is a nitrogen compound containing Sm and Fe (Sm—Fe—N compound). By using an Sm—Fe—N based alloy (Sm—Fe—N compound) for the magnetic particles, it is possible to express excellent magnetic properties without raising the temperature to a high temperature of 600° C. or more, when a magnet molding is formed using coated magnetic particles comprising said magnetic particles (core portions). Accordingly, it is possible to mold with an existing cemented carbide or die-steel molding die, and, by using a raw material powder with a small particle diameter, it is possible to effectively obtain a magnet molding with high coercive force. In addition, it is possible to obtain a high-density bond magnet molding (relative density of 50% or more), which cannot be obtained by the conventional process, and provides the capability of reducing the size of equipment parts, such as a motor. Magnetic particles mainly composed of a nitrogen compound containing Sm and Fe usually contain a rare earth magnet phase mainly composed of an Sm—Fe—N based alloy. Coated magnetic particles having magnetic particles (core portions) mainly composed of an Sm—Fe—N based alloy have excellent magnetic properties, and thus show promise as permanent magnets.

More specifically, examples of magnetic particles mainly composed of a nitrogen compound containing Sm and Fe include $Sm_2Fe_{17}N_x$ (here, x is preferably 1-6, more preferably 1.1-5, even more preferably 1.2-3.8, more preferably 1.7-3.3, and particularly preferably 2.0-3.0), $Sm_2Fe_{17}N_3$ $(Sm_{0.75}Zr_{0.2.5})$ $(Fe_{0.7}Co_{0.3})N_x$ (here, x is preferably 1-6), $SmFe_{11}TiN_x$ (here, x is preferably 1-6), and $(Sm_8Zr_3Fe_{84})_{85}N_{15}$, $Sm_7Fe93N$, (here, x is preferably 1-20), but no limitation is imposed thereby. More preferably, magnetic particles having a magnet portion of $Sm_2Fe17N_x$ (x=1.7-3.3) and more preferably $Sm_2Fe_{17}N_x$ (x=3.0) are desirable. This is because the anisotropic magnetic field is strong and the saturation magnetization is high and the magnetic properties are excellent. These magnetic particles mainly composed of an Sm—Fe—N based alloy may be used individually, or as a mixture of two or more types.

The content amount of the main component (Sm—Fe—N) of the Sm—Fe—N based alloy magnetic particles of the present embodiment may be any amount as long as Sm—Fe—N is the main component, and is such that Sm—Fe—N constitutes 50 wt % or more, preferably 80 wt % or more, more preferably 90 wt % or more, and even more preferably 90-99 wt % or more, with respect to all the magnetic particles. The reason that the upper limit of the more preferable range is set to 99 wt % and not 100 wt % is due to the existence of inevitable impurities. That is, in the present embodiment, it is sufficient if the content amount is 50 wt % or more, and while it is possible to use one that is 100 wt %, in practice, it is difficult and complex or it requires a high-level purification (refining) technique to remove the inevitable impurities, and is thus costly.

Furthermore, (rare earth magnet phase of the) magnetic particles mainly composed of an Sm—Fe—N based alloy that include elements other than the main component Sm—Fe—N are also included within the technical scope of the present embodiment. Examples of other elements that may be contained other than Sm—Fe—N include Ga, Nd, Zr, Ti, Cr, Co, Zn, Mn, V, Mo, W, Si, Re, Cu, Al, Ca, B, Ni, C, La, Ce, Pr, Pm, Eu, Gd, Tb, Dy, Ho, Er, Tm, Yb, Lu, Y, Th, and MM, preferably Co or Ni substituting Fe, and B or C substituting N, but no limitation is imposed thereby. These may be contained individually, or two or more types may be contained. These elements are mainly introduced by substituting a portion of the phase structure of the (rare earth magnet phase of the) magnetic particles mainly composed of Sm—Fe—N, or by insertion, or the like.

Similarly, the magnetic particles mainly composed of an Sm—Fe—N based alloy may contain a rare earth magnet phase (magnetic alloy component) other than Sm—Fe—N. Examples of such other rare earth magnet phases include existing rare earth magnet phases other than Sm—Fe—N. Examples of such other existing rare earth magnet phases include those based on Sm—Co alloys such as $Sm_2Fe_{14}B$, $Sm_2C0_{14}B$, $Sm_2(Fe_{1-x}Co_x)_{14}B$ (here, x is preferably 0≤x≤0.5), $Sm_{15}Fe_{77}B_5$, $Sm_{15}Co_{77}B_5$, $Sm_{11.77}Fe_{82.35}B_{5.88}$, $Sm_{11.77}Co_{82.35}B_{5.88}$, $Sm_{1.1}Fe_4B_4$, $Sm_{1.1}Co_4B_4$, $Sm_7Fe_3B_{10}$, $Sm_7Co_3B_{10}$, $(Sm_{1-x}Dy_x)_{15}Fe_{77}B_8$ (here, x is preferably 0≤x≤0.4), $(Sm_{1-x}Dy_x)_{15}Co_{77}B_8$ (here, x is preferably 0≤x≤0.4), $Sm_2Co_{17}N_x$ (here, x is preferably 1-6), $Sm_{15}(Fe_{l-x}Co_x)_{77}B_7Al_1$, $Sm_{15}$ $(Fe_{0.08}Co_{0.02})_{77-y}B_8Al_y$ (here, y is preferably 0≤y≤5), $(Sm_{0.95}Dy_{0.05})_{15}Fe_{77.5}B_7Al_{0.5}$, $(Sm_{0.95}Dy_{0.05})_{15}(Fe_{0.95}Co_{0.05})_{77.5}B_{6.5}AI_{0.5}Cu_{0.2}$, $Sm_4Fe_{80}B_{20}$, $Sm_{4.5}Fe_{73}Co_3GaB_{18.5}$, $Sm_{5.5}Fe_{66}Cr_5Co_5B_{18.5}$, $Sm_{10}Fe_{74}Co_{10}SiB_5$, $Sm_{3.5}Fe_{78}B_{18.5}$, $Sm_4Fe_{76.5}B_{18.5}$, $Sm_4Fe_{77.5}B_{18.5}$, $Sm_{4.5}Fe_{77}B_{18.5}$, $Sm_{3.5}DyFe_{73}Co_3GaB_{18.5}$, $Sm_{4.5}Fe_{72}Cr_2Co_3B_{18.5}$, $Sm_{4.5}Fe_{73}V_3SiB_{18.5}$, $Sm_{4.5}Fe_{71}Cr_3Co_3B_{18.5}$, $Sm_{5.5}$, $Fe_{66}Cr_5Co_5B_{18.5}$, $SmCo_5$, $Sm_2Co_{17}$, $Sm_3Co$, $Sm_3Co_9$, $SmCo_2$, $SmCo_3$, $Sm_2Co_7$, Sm—Fe alloys such as $Sm_2Fe_{17}$, $SmFe_2$, $SmFe_3$, Ce—Co alloys such as $CeCo_5$, $Ce_2Co_{17}$, $Ce_{24}Co_{11}$, $CeCo_2$, $CeCo_3$, $Ce_2Co_7$, $Ce_5Co_{19}$, Nd—Fe alloys such as $Nd_2Fe_{17}$, Ca—Cu alloys such as $CaCu_5$, Tb—Cu alloys such as $TbCu_7$, Sm—Fe—Ti alloys such as $SmFe_{11}Ti$, Th—Mn alloys such as $ThMn_{12}$, Th—Zn alloys such as $Th_2Zn_{17}$, Th—Ni alloys such as $Th_2Ni_{17}$, $La_2Fe_{14}B$, $CeFe_{14}B$, $Pr_2Fe_{14}B$, $Gd_2Fe_{14}B$, $Tb_2Fe_{14}B$, $Dy_2Fe_{14}B$, $Ho_2Fe_{14}B$, $Er_2Fe_{14}B$, $Tm_2Fe_{14}B$, $Yb_2Fe_{14}B$, $Y_2Fe_{14}B$, $Th_2Fe_{l4}B$, $La_2Co_{14}B$, $CeCo_{14}B$, $Pr_2Co_{14}B$, $Gd_2Co_{14}B$, $Tb_2Co_{14}B$, $Dy_2Co_{14}B$, $Ho_2Co_{14}B$, $Er_2Co_{14}B$, $Tm_2Co_{14}B$, $Yb_2Co_{14}B$, $Y_2Co_{14}B$, $Th_2Co_{14}B$, $YCo_5$, $LaCo_5$, $PrCo_5$, $NdCo_5$, $GdCo_5$, $TbCo_5$, $DyCo_5$, $HoCo_5$, $ErCo_5$, $TmCo_5$, $MMCo_5$, $MM_{0.8}Sm_{0.2}Co_5$, $Sm_{0.6}Gd_{0.4}Co_5$, $YFe_{11}Ti$, $NdFe_{11}Ti$, $GdFe_{11}Ti$, $TbFe_{11}Ti$, $DyFe_{11}Ti$, $HoFe_{11}Ti$, $ErFe_{11}Ti$, $TmFe_{11}Ti$, $LuFe_{11}Ti$, $Pr_{0.6}Sm_{0.4}Co$, $Sm_{0.6}Gd_{0.4}Co_5$, $Ce(Co_{0.72}Fe_{0.14}Cu_{0.14})_{5.2}$, Ce $(Co_{0.73}Fe_{0.12}Cu_{0.14}0.01)_{6.5}$, $(Sm_{0.7}Ce_{0.3})$ $(Co_{0.72}Fe_{0.16}Cu_{0.12})_7$, Sm $(Co_{0.69}Fe_{0.20}Cu_{0.10}Zr_{0.01})_{7.4}$, and Sm $(Co_{0.65}Fe_{0.21}Cu_{0.05}Zr_{0.02})_{7.67}$, but no limitation is imposed thereby at all. These may be contained individually, or two types or more may be contained. Other than the foregoing, the magnetic particles of the present embodiment (preferably having an Sm—Fe—N based alloy as the main component) may contain, as inevitable components, Fe. rare earth impurities, Fe-rich phases, Fe-poor phases, and other inevitable impurities.

The magnetic particles may be of any shape. Examples include a spherical shape, an elliptical shape (preferably with an aspect ratio (aspect ratio) of the center portion cross section that is parallel to the major axis direction that is in the range of more than 1.0 but not more than 10), a cylindrical shape, a polygonal columnar shape (for example, triangular prism, quadrangular prism, pentagonal prism, hexagonal prism, . . . n-angular prism (where n is an integer of 7 or more)), an acicular or rod shape (preferably with an aspect ratio of the center portion parallel to the long axis direction that is more than 1.0 but not more than 10.), a plate-like shape, a disk (disk) shape, a flake-like shape, a scale-like shape, and an irregular shape, but no limitation is imposed thereby. The rare earth magnet phase of the R-M-X (Sm—Fe—N etc.) that constitutes the magnetic particles has a crystal structure (single crystal structure), which may be made into a predetermined crystal shape (single-crystal magnetic particles) by crystal growth.

It is sufficient if the size (average particle diameter) of the magnetic particles is within a range with which it is possible to effectively exhibit the action and effect of the present embodiment, but since the coercive force increases as the particle size decreases, the size is preferably 0.1-10 μm. The size is more preferably 0.5-10 μm, and still more preferably 1-5 μm. If the average particle diameter of the magnetic particles is 0.1 μm or more, it is a relatively simple matter to carry out storage in a slurry state as well as separation from the solvent, facilitating handling, in addition to which, by using magnetic particles having said magnet portions, it is possible to suppress binding between the magnetic particles even when forming at a high density, and to make a magnet molding having excellent magnetic properties (particularly residual magnetic flux density) at a high density, without a net decrease of the magnetic particles. In addition, if the average particle diameter of the magnetic particles described above is 10 μm or less, excellent coercive force properties can be obtained, in addition to which, by using coated magnetic particles having said magnetic particles (core portions), it is possible to suppress binding between the magnetic particles (core portions), even when forming at a high density, and to make a magnet molding having excellent magnetic properties (particularly coercive force) at a high density.

Here, the average particle diameter of the magnetic particles can be subjected to grain size analysis (measured) by SEM (scanning electron microscope) observation, TEM (transmission electron microscope) observation, or the like. There are cases in which the magnetic particles or the cross sections thereof include particles (powder) that are of an indefinite shape, in which the aspect ratios (aspect ratios) are different, rather than spherical or circular shapes (cross-sectional shape). Therefore, since the shapes of the magnetic particles (or the cross-sectional shapes thereof) are not uniform, the average particle diameter described above is represented by the average value of the absolute maximum lengths of the cross-sectional shapes of the magnetic particles in the observation image (several to several tens of fields of view). The absolute maximum length is the maximum length from among the distances between two arbitrary points on the contours of the magnetic particle (or the cross-sectional shape thereof). The average particle diameter may be similarly obtained using other measurement methods as well. Other than the above, if the influence of the agglomeration of particles is small, for example, the average particle diameter may be obtained by calculating the average value of the crystallite diameter obtained from the full width at half maximum of the diffraction peak of the rare earth magnet phase in X-ray diffraction, or of the particle diameter of the magnetic particles obtained from transmission electron microscopic images.

(2) Oxide Layer

Figure 3:
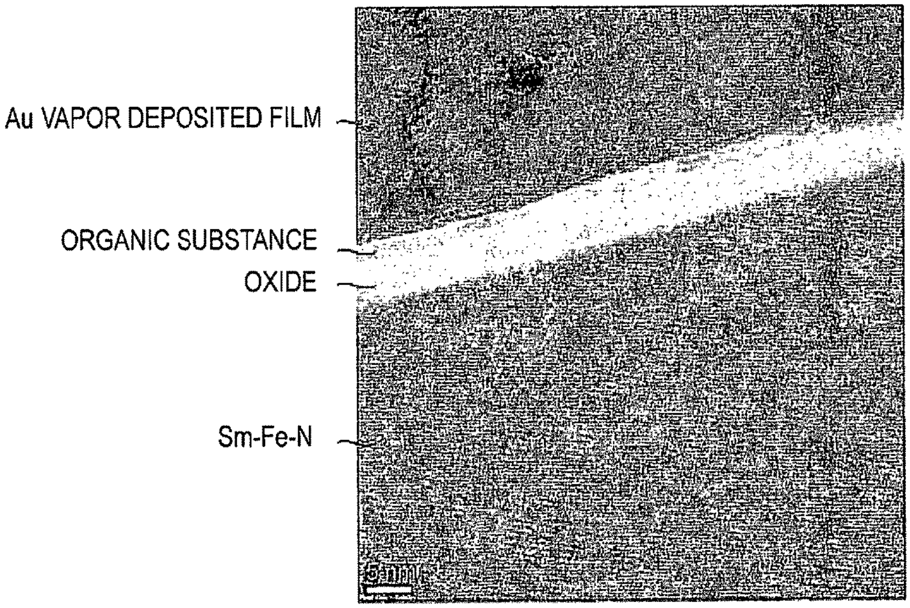
FIG. 3 is a diagram (electron micrograph) illustrating the result obtained through a TEM observation of the surface condition of the coated magnetic particles of Experimental Example 1.

The coated magnetic particles of the present embodiment have a coating of an oxide layer with a film thickness of 1-20 nm on the surface of the magnetic particles (refer to FIGS. 3, 4). The oxide layer preferably has a single-layer structure, but may have a layer structure of two or more layers. A layer structure of two or more layers can be formed by CVD, PVD, passivation treatment, or the like. If the oxide layer is extremely thick, the net magnet (the core portions occupying the coated magnetic particles) volume ratio decreases; therefore, the oxide layer is preferably as thin as possible, but if the oxide layer is too thin, a newly generated surface appears at the time of forming, and the particles are more apt to bind with each other. Therefore, it is necessary for the film thickness (thickness) of the oxide layer to be within the range of 1-20 nm, preferably 1-15 nm, and more preferably in the range of 3-15 nm. Here, examples of oxides that constitute the oxide layer (oxide film) include nonmagnetic and antiferromagnetic oxides, such as oxides of a magnet alloy component constituting the magnetic particles, preferably an R-M-X based alloy (R-M-X compound), for example rare earth oxides (samarium oxide, etc.), transition metal oxides (iron oxide, etc.), and nonmetal oxides (for example, nitrogen oxide, etc.), but no limitation is imposed thereby.

The film thickness of the oxide layer (oxide film) may be calculated by obtaining the average particle diameter of (magnetic particles+oxide layer) in the same manner as for the average particle diameter of the magnetic particles described above, and calculating (average particle diameter of magnetic particles+oxide layer) to (average particle diameter of magnetic particles)=film thickness of oxide layer (oxide film).

The oxide layer (oxide film) can be formed by subjecting the magnetic particles (surface) to oxidation treatment. For example, (1) it is possible to suitably use a method in which, when (wet) milling raw material coarse grains of the magnetic particles using a ball mill, a bead mill, or the like, in a fine pulverization step, the water content of the solvent and the oxygen concentration of the inert gas atmosphere at the time of drying are controlled. In addition, (2) it is also possible to use a method in which magnetic particles are subjected to heat treatment (oxidation treatment) in an oxygen-containing atmosphere gas after a fine pulverization step by (dry) milling. Other than the above, methods such as PVD, CVD, plating method, passivation treatment, sol gel method, etc., may be used, and there is no limitation. It is possible to form an oxide film (oxide layer) with an appropriate thickness (1-20 nm) on the surface of the magnetic particles with these methods. In particular, method (1) is excellent in terms of production efficiency, since it is possible to form an oxide layer (organic layer) during the step to finely pulverize the raw material coarse grains of the magnetic particles (drying step).

In method (1) described above, the water content of the solvent is not particularly limited as long as an oxide layer (oxide film) can be formed to the desired thickness, but is preferably 0.01-3.0 vol %, and more preferably in the range of 0.01-1.0 vol %. From the standpoint of uniform oxidation of the entire particle surface, it is preferable if the water content in the solvent is 0.01 vol % or more, preferably 0.1 vol %, and, from the standpoint of suppressing a rapid oxidation reaction or an excessive oxidation reaction, it is preferable if the water content is 3.0 vol % or less. In addition, the oxygen concentration of the inert gas atmosphere during drying is not particularly limited as long as an oxide layer (oxide film) can be formed to the desired thickness, but is preferably 0.005-2 vol %, and more preferably in the range of 0.05-1.0 vol %. From the standpoint of uniform oxidation of the entire particle surface, it is preferable if the oxygen concentration in the inert gas atmosphere is 0.005 vol % or more, and, from the standpoint of suppressing a rapid oxidation reaction or an excessive oxidation reaction, it is preferable if the oxygen concentration in the inert gas atmosphere is 2 vol % or less, preferably 1.0 vol % or less.

It is possible to form an oxide film (oxide layer) to an appropriate thickness (1-20 nm) on the surface of the magnetic particles by subjecting the magnetic particles to heat treatment (oxidation treatment) in an oxygen-containing inert gas atmosphere gas, after the fine pulverization step (2) described above. The method of growing the oxide layer is not particularly limited to heat treatment.

In method (2) described above, the oxygen concentration of the inert gas atmosphere is not particularly limited as long as an oxide layer (oxide film) can be formed to the desired thickness, but is preferably 0.005-2.0 vol %, and more preferably in the range of 0.05-1.0 vol %. From the standpoint of uniform oxidation of the entire particle surface, it is preferable if the oxygen concentration in the inert gas atmosphere is 0.005 vol % or more, and, from the standpoint of suppressing a rapid oxidation reaction or an excessive oxidation reaction, it is preferable if the oxygen concentration in the inert gas atmosphere is 2.0 vol % or less. In addition, the heat treatment temperature is also not particularly limited as long as an oxide layer (oxide film) can be formed to the desired thickness, but is preferably 80-450° C., and more preferably in the range of 80-200° C. From the standpoint of the time and to allow the oxidation reaction to proceed, it is preferable if the heat treatment temperature is 80° C. or more, and, from the standpoint of suppressing the deterioration of the magnet, it is preferable if the heat treatment temperature is 450° C. or less. The heat treatment time is also not particularly limited as long as an oxide layer (oxide film) can be formed to the desired thickness, but is preferably 3-100 minutes, and more preferably in the range of 5-30 minutes. From the standpoint of the overall growth of the oxide film, it is preferable if the heat treatment time is 3 minutes or more, and, from the standpoint of suppressing an excessive reduction in magnet performance, it is preferable if the heat treatment time is 100 minutes or less.

(3) Organic Layer

The coated magnetic particles of the present embodiment have a coating of an organic layer with a film thickness of 1-100 nm on the outer side of the oxide layer (refer to FIGS. 3, 4). The organic layer preferably has a single-layer structure, but may have a layer structure of two or more layers. A layer structure of two or more layers can be formed by overlaying organic films of different composition, or organic films (thin-films) of the same composition. The organic layer formed on the outermost surface of magnetic particles protects the oxide layer that is on the inner side of the organic layer due to the lubrication effect and is thought to exhibit an effect of suppressing binding between magnetic particles due to the formation of carbides and the remaining of the organic layer, at the time of forming and processing a bond magnet molding. Accordingly, if the organic layer is too thin, the effects described above cannot be obtained; whereas, if the organic layer is too thick, an increase the density is hindered; therefore, it is necessary for the film thickness (thickness) of the organic layer to be within the range of 1-100 nm, preferably 1-50 nm, and more preferably in the range of 1-20 nm.

The film thickness of the organic layer may be calculated by obtaining the average particle diameter of (magnetic particles+oxide layer+organic layer) in the same manner as the average particle diameter of the magnetic particles described above, and calculating (average particle diameter of coated magnetic particles) to (average particle diameter of magnetic particles+oxide layer)=film thickness of organic layer.

The organic substance constituting the organic layer described above is not particularly limited as long as the effects described above can be effectively exhibited when the film thickness is as described above. Specific examples thereof include fatty acids and fatty acid esters with a carbon number of 6-24, such as caproic acid (carbon number: 6), methyl caproate, ethyl caproate, butyl caproate, enanthic acid (heptylic acid) (carbon number: 12), methyl enanthate, ethyl enanthate, butyl enanthate, octanoic acid (caprylic acid) (carbon number: 14), ethyl octanoate, methyl octanoate, butyl octanoate, pelargonic acid (carbon number: 16), methyl pelargonate, ethyl pelargonate, butyl pelargonate, capric acid (carbon number: 18), methyl caprate, ethyl caprate, butyl caprate, lauric acid (carbon number: 20), methyl laurate, ethyl laurate, butyl laurate, myristic acid (carbon number: 24), methyl myristate, ethyl myristate, butyl myristate, palmitic acid (carbon number: 6), methyl palmitate, ethyl palmitate, butyl palmitate, stearic acid (carbon number: 7), methyl stearate, ethyl stearate, butyl stearate, arachidic acid (carbon number: 8), methyl arachidate, ethyl arachidate, and butyl arachidate (carbon number: 24). These may be used individually, or two or more types may be used in combination. In particular, it is suitable to use fatty acid esters with a carbon number of 6-24 such as methyl caproate, ethyl caproate, butyl caproate, methyl enanthate, ethyl enanthate, butyl enanthate, ethyl octanoate, methyl octanoate, butyl octanoate, methyl pelargonate, ethyl pelargonate, butyl pelargonate, methyl caprate, ethyl caprate, butyl caprate, methyl laurate, ethyl laurate, butyl laurate, methyl myristate, ethyl myristate, butyl myristate, methyl palmitate, ethyl palmitate, butyl palmitate, methyl stearate, ethyl stearate, butyl stearate, methyl arachidate, ethyl arachidate, and butyl arachidate, since it is thereby possible obtain a lubrication effect, an oxidation prevention effect, and a binding suppression effect at the time of solidification molding. Furthermore, from the point of view of being excellent in the action and effect described above, fatty acid esters with a carbon number of 6-16 such as methyl caprate, ethyl caprate, butyl caprate, methyl laurate, ethyl laurate, butyl laurate, methyl myristate, ethyl myristate, and butyl myristate are preferable. In particular, lauric acid esters such as methyl laurate, ethyl laurate, and butyl laurate are preferable, of which methyl laurate is particularly preferable.

It is sufficient if the size (average particle diameter) of the magnetic particles is within a range in which it is possible to effectively exhibit the action and effect of the present embodiment, but since the coercive force increases as the particle size decreases, the size is preferably 0.1-10 μm. The size is more preferably 0.5-10 μm, and further preferably 1-5 μm. If the average particle diameter of the coated magnetic particles described above is 0.1 μm or more, the particles are not easily affected by static electricity, and the like, and countermeasures to agglomeration and adhesion can be easily undertaken, making handling relatively easy, in addition to which, by using the coated magnetic particles, it is possible to suppress binding between the magnetic particles (core portions) even when forming at a high density, and to make a magnet molding with excellent magnetic properties (particularly residual magnetic flux density and coercive force) at a high density. In addition, if the average particle diameter of the coated magnetic particles described above is 10 μn or less, excellent coercive force properties can be obtained, in addition to which, by using the coated magnetic particles, it is possible to suppress binding between the magnetic particles (core portions) even when forming at a high density, and to make a magnet molding having excellent magnetic properties (residual magnetic flux density and coercive force) at a high density.

The coated magnetic particles may be of any shape. Examples include a spherical shape, an elliptical shape (preferably with an aspect ratio (aspect ratio) of the center portion cross section that is parallel to the major axis direction that is in the range of more than 1.0 but not more than 10), a cylindrical shape, a polygonal columnar shape (for example, triangular prism, quadrangular prism, pentagonal prism, hexagonal prism, . . . n-angular prism (where n is an integer of 7 or more)), an acicular or rod shape (preferably with an aspect ratio of the center portion parallel to the long axis direction that is more than 1.0 but not more than 10. ), a plate-like shape, a disk (disk) shape, a flake-like shape, a scale-like shape, and an irregular shape, but no limitation is imposed thereby. The rare earth magnet phase of the coated magnetic particles has a crystal structure (single-crystal structure), which may be made into a predetermined crystal shape by crystal growth.

Second Embodiment (II) Metal Bond Magnet Molding

The second embodiment of the present invention is a metal bond magnet molding characterized by being produced by molding using the coated magnetic particles described above. With this configuration, a large amount of resin (binder) is not contained as in existing bond magnets, and binding between the magnetic particles (core portions) is suppressed; therefore, it is possible to obtain a magnet molding which maintains an excellent coercive force of the finely pulverized magnetic particles.

It can be said that the metal bond magnet molding of the present embodiment may be obtained by the coated magnetic particles of the first embodiment described above being (solidification) molded with an appropriate metal binder (metal bond). Accordingly, in the present embodiment, it is preferable that an organic substance, particularly an organic polymer binder (resin binder), is not contained. With this configuration, the core portion (magnetic particle) volume ratio of the coated magnetic particles described above is high, and a magnet molding with a strong magnetic force can be obtained, in addition to which there is the advantage that the operating temperature can be high. The foregoing is true since if the organic substance (organic polymer) binder were to occupy a large proportion of the bond magnet molding, around 30%, the magnet molding would not function as a magnet and the magnetic properties thereof would deteriorate. Since it is possible to obtain a metal bond magnet molding by (solidification) molding without including an organic substance (organic polymer) binder, the present embodiment is superior in being able to prevent a deterioration of the magnetic properties caused by the organic substance (organic polymer) binder. Additionally, by not using an organic substance (organic polymer) binder with a low melting point, it is possible to obtain a magnet molding that can be used in higher temperature environments. However, the present embodiment includes cases in which an organic substance (organic polymer) binder is contained in trace amounts to the degree to which the magnetic properties do not deteriorate.

In the metal bond magnet molding of the present embodiment, the forming method described above is preferably die molding. With this configuration, the core portion (magnetic particle) volume ratio of the coated magnetic particles described above is high, and a magnet molding with high magnetic force can be obtained. The die molding is not particularly limited. Examples include such means as hot or cold compaction molding using a molding die, which may be further carried out in a magnetic field, or preforming may be carried out using a molding die in a magnetic field in advance, and the hot or cold compaction molding described above may be carried out using the molding die as is. The details of these molding methods (specific molding conditions, and the like) will be described in the method of manufacturing the magnet molding of the fourth embodiment.

The magnet molding of the present embodiment preferably has a relative density of 50% or more. This is because, if the relative density is 50% or more, the magnet molding will have sufficient flexural strength for use in electromagnetic device, such as on-board motors, vehicle-mounted sensors, actuators, voltage conversion devices, and the like. The relative density is affected by the composition of the magnet molding, and the pressure during the manufacturing stage, particularly at the time of pressurization (compaction) molding. The relative density of the magnet molding is preferably 80% or more, more preferably 85% or more. While the upper limit of the relative density is not particularly limited, 96% or less is preferable, since it is preferable that the oxide layer and the organic layer occupy about 4%. The relative density is obtained by using the true density obtained by calculation, and the measured density obtained from weight measurement and the dimensions of the magnet molding. The relative density is the ratio (%) of the measured density to the true density, calculated by dividing the value of the measured density by the value of the theoretical density and multiplying by 100.

In the magnet molding of the present embodiment, the boundary layer of the magnetic particles (between the magnet particles) inside the molding is preferably an intermittent oxide, carbide, organic material, void, or a composite thereof, having a thickness of 1-20 nm. With this configuration, it is possible for the magnetic particles (core portions) having a minute particle diameter to maintain a high coercive force, due to the presence of a nonmagnetic substance interposed in the gaps between the magnetic particles (core portions). That is, the magnet molding of the present embodiment is manufactured by subjecting coated magnetic particles to (solidification) molding. At the time of such molding (and further, during heat treatment thereafter), heating and pressure molding are carried out at 600° C. or less and at 1-5 GPa (further heat-treated at 600° C. or less). Accordingly, portions of the oxide layer and the organic layer of the coated magnetic particles are carbonized to form carbides and voids, and there are cases in which composites (oxynitride, and the like) are further produced; these oxides, carbides, composites, residual organic substances, and voids are crushed, to form a boundary layer reduced in thickness to about 1-20 nm. Here, the reason for using the term "intermittent" is because there does not exist a continuous boundary layer formed of oxides over the entire surface of the magnetic particles (core portions), but rather the boundary layer is formed such that the oxide portion, the carbide portion, the organic substance portion, and the void portion are intermittently present (mixed), like a patchwork (patchwork). Furthermore, it is not necessary to have the boundary layer on the entire surface of the magnetic particles (core portions), and, for example, a metal binder may extend into gaps between the magnetic particles (core portions) such that the metal binder occupies a portion of the surface of the magnetic particles (core portions). Furthermore, portions in which the magnetic particles (core portions) are in contact with each other may be present in a very small part of the magnetic particle surfaces. The component analysis of the boundary layer can also be calculated by elemental analysis using XPS and EDX (energy dispersive X-ray spectroscopy), WDS (wavelength dispersive X-ray spectroscope), AES (Auger analysis), GDS, or the like. The film thickness of the boundary layer can be calculated from SEM observation and TEM observation (it can be calculated in the same manner as the average particle diameter of the particles).

The magnet molding of the present embodiment is preferably manufactured by mixing coated magnetic particles, the core portions of which are Sm—Fe—N based magnetic particles, and Zn particles mixed as a metal binder, carrying out solidification molding (compaction molding) thereof, followed by heat treatment. With such a configuration, by carrying out die molding by mixing zinc particles with coated magnetic particles, it is possible to manufacture an Sm—Fe—N based high-density compacted body (magnet molding). By heat treating the Sm—Fe—N based high-density compacted body (magnet molding), the zinc of the metal binder reacts with the Sm—Fe—N of the magnetic particle, which is excellent in that it is possible to produce an Sm—Fe—N based magnet molding (a heat-treated product of zinc-added Sm—Fe—N based magnet molding) with a high coercive force. In addition, by setting the mixed state of Zn such that the densified region formed by the reaction product of Zn and Fe is reduced so as to not remain at the time of heat treatment, diffusion of zinc through the boundary layer of the magnetic particles (between the magnetic particles) becomes facilitated, and it becomes possible to cause the zinc to diffuse so as to surround the Sm—Fe—N based magnetic particles, which improves the coercive force. The method of die molding and heat treatment (specific molding conditions, heat treatment conditions, etc.) will be described in the method of manufacturing the magnet molding in the fourth embodiment.

In the case that the magnet molding of the present embodiment is the magnet molding described above (a heat-treated product of zinc-added Sm—Fe—N based magnet molding), it is further preferable to include the following configurations. That is, in the above-described magnet molding (heat-treated product), it is preferable for the thickness of the densified region formed by the reaction product of Zn and Fe produced around the Zn binder described above to be 5 μm or less, and more preferably 1 μm or less. This is because, by reducing the densified region formed by the reaction product of Zn and Fe so as to not remain by heat treatment, diffusion of zinc through the boundary layer of the magnetic particles (between the magnetic particles) becomes facilitated, and it becomes possible to cause the zinc to diffuse so as to surround the Sm—Fe—N based magnetic particles, which improves the coercive force. It is thereby possible to provide an Sm—Fe—N based metal bond magnet molding with a higher coercive force.

Here, the thickness of the densified region may be found by determining the densified region (reaction phase of Zn) by SEM observation (refer to FIG. 13), and taking the length of the densified region (reaction phase of Zn) measured in the same manner as the absolute maximum length of the average particle diameter of the particles described above as the thickness of the densified region. Specifically, the thickness of the densified region (reaction phase of Zn) may be calculated by obtaining the average particle diameter of (original Zn region+reaction phase of Zn), and calculating: (average thickness of original Zn region+reaction phase of Zn) to (average thickness of original Zn region)=thickness of densified region (reaction phase of Zn). Here, the average thickness is defined as the average value of the maximum length and the minimum length of (original Zn region+reaction phase of Zn (thickness thereof)) or of (original Zn region (thickness thereof)). In this case as well, the thickness of the densified region is represented by the average value of the absolute maximum length of the cross-sectional shape of each densified region in the observation image (several to several tens of fields of view).

In the case that the magnet molding of the present embodiment is the magnet molding described above (a heat-treated product of zinc-added Sm—Fe—N based magnet molding), it is further preferable to include the following configurations. That is, in the magnet molding (heat-treated product) described above, the amount of added Zn particles is 1-15 wt %, preferably 3-10 wt %. If the amount of added Zn particles is 1 wt % or more, it is possible to secure a sufficient amount of Zn such that the zinc diffuses so as to surround the Sm—Fe—N based magnetic particles to improve the coercive force, which is excellent in terms of obtaining an Sm—Fe—N based metal bond magnet molding with high coercive force. If the amount of added Zn particles is 20 wt % or less, the diffusion of zinc through the boundary layer between the magnetic particles becomes facilitated, without a reduction in the residual magnetic flux density Br caused by adding a large amount of zinc, and a sufficient amount of Zn can be provided such that the zinc diffuses so as to surround the Sm—Fe—N based magnetic particles. It is thereby possible to provide an Sm—Fe—N based metal bond magnet molding with higher coercive force.

In the case that the magnet molding of the present embodiment is the magnet molding described above (a heat-treated product of zinc-added Sm—Fe—N based magnet molding), it is further preferable to include the following configurations. That is, in the case of the magnet molding (heat-treated product) described above, the relative density of the magnet molding is preferably 80% or more. If the relative density is within the range described above, the result is the excellent effect of being able to provide an Sm—Fe—N based metal bond magnet molding with high coercive force, made possible by increasing the density.

It can be said that the magnet molding of the present embodiment is preferably obtained by the coated magnetic particles of the first embodiment described above being (solidification) molded with an appropriate metal binder (metal bond). Each of the constituent requirements will be described below.

(1) Coated Magnetic Particles

The coated magnetic particles used in the magnetic particles of the present embodiment uses the coated magnetic particles of the first embodiment described above, and is as described in the above-described first embodiment.

The compounding amount of the coated magnetic particles described above is preferably 70 wt % or more, more preferably 80-99.9 wt % or more, still more preferably 85-99 wt % or more, and particularly preferably in the range of 90-97 wt %, with respect to the total weight of the magnet molding. If the compounding amount of the coated magnetic particles is 70 wt % or more, it is possible to suppress the binding between the magnetic particles (core portions), and there is no risk of impairing the magnetic properties of the magnet molding. Furthermore, if the compounding amount of the coated magnetic particles is 85 wt % or more, particularly 90 wt % or more, there is the particularly excellent effect of improving the coercive force and being able to obtain an Sm—Fe—N based metal bond magnet molding with high coercive force. The upper limit of the compounding amount of the coated magnetic particles is not particularly limited and may be 100 wt %. If the compounding amount of the coated magnetic particles is 99.9 wt % or less, a set amount of the metal binder can be blended, so that the excellent effect of the metal binder can be exhibited. If the compounding amount of the coated magnetic particles is 99 wt % or less, particularly 97 wt % or less, it is particularly excellent in terms of improving the coercive force and being able to obtain an Sm—Fe—N based metal bond magnet molding with high coercive force.

(2) Metal Binder (Metal Particles)

The magnet molding of the present embodiment is preferably made by (solidification) molding with a metal binder (metal bond). That is, the metal binder is an optional component (refer to Example 3). By using a metal binder, the moldability is improved due to the binding of the metal binder components during hot or cold compaction molding. Therefore, the magnet molding of the present embodiment using a metal binder (metal bond) has excellent mechanical strength. Furthermore, since the metal binder alleviates the internal stress that is generated at the time of molding, it is possible to obtain a magnet molding with few defects. Furthermore, by using metal particles as a binder material at the time of hot or cold compaction molding, it is possible to obtain a magnet molding that can be used in a high-temperature environment. When using a metal binder, the magnetic particles and the metal particles (binder material) should be mixed until the magnetic particles and the binder material are uniformly mixed with a mixer, or the like, and then subjected to compaction molding. Since it is only necessary to use a relatively small amount of metal binder compared with an organic substance (organic polymer) binder in an existing bond magnet, there is no risk that the metal binder will affect the magnetic properties and cause the deterioration thereof.

The compounding amount of the metal binder is preferably 30 wt %, more preferably 0.1-20 wt % or more, even more preferably 1-15 wt % or more, and particularly preferably in the range of 3-10 wt %, with respect to the total weight of the magnet molding. If the compounding amount of the metal binder is 30 wt % or less, there is no risk of impairing the magnetic properties of the magnet molding. Furthermore, if the compounding amount of the metal binder is 15 wt % or less, particularly 10 wt % or less, there is the excellent effect of improving the coercive force and being able to obtain an Sm—Fe—N based metal bond magnet molding with a high coercive force. In addition, since the metal binder is an optional component, the lower limit of the compounding amount is not particularly limited. When using a metal binder, if the compounding amount of the metal binder is 0.1 wt % or more, the effect as binder can be sufficiently exhibited. If the compounding amount of the metal binder is 1 wt % or less, particularly 3 wt % or less, there is the excellent effect of improving the coercive force and being able to obtain an Sm—Fe—N based metal bond magnet molding with high coercive force.

The average particle diameter of the metal particles to be blended at the time of manufacture as metal binder may be any diameter within a range that can effectively exhibit the action and effect of the present embodiment, and is usually 0.01-10 μm, preferably 0.05-8 μm, and more preferably in the range of 0.1-7 μm. If the average particle diameter of the metal particles is 0.01-10 μm, it is possible to obtain a desired magnet molding having excellent magnet characteristics (coercive force, residual magnetic flux density, adhesion). Since the metal particles as the binder material extend between the magnetic particles during molding and are present in the magnet molding in in a state in which their particle shape is not maintained, the size of the metal particles defined here (average particle diameter) is that at the manufacturing stage (particularly at the stage before solidification molding). The average particle diameter of the metal particles can be measured by the laser diffraction method, and $D_{50}$ is used as an index.

The shape of the metal particles to be blended at the time of manufacture as metal binder may be any shape within the range of not impairing the action and effect of the present invention. Examples include a spherical shape, an elliptical shape (preferably with an aspect ratio (aspect ratio) of the center portion cross section that is parallel to the major axis direction that is in the range of more than 1.0 but not more than 10), a cylindrical shape, a polygonal columnar shape (for example, triangular prism, quadrangular prism, pentagonal prism, hexagonal prism, . . . n-angular prism (where n is an integer of 7 or more)), an acicular or rod-like shape (preferably with an aspect ratio of the center portion parallel to the long axis direction that is more than 1.0 but not more than 10. ), a plate-like shape, a disk (disk) shape, a flake-like shape, a scale-like shape, and an irregular shape, but no limitation is imposed thereby.

The metal particles to be blended at the time of manufacture as metal binder are preferably nonmagnetic metal particles in which the elastic/plastic ratio of energy accompanying plastic deformation is 50% or less (hereinafter also abbreviated as nonmagnetic metal particles having an elastic/plastic ratio of 50% or less). This is because easily deformable particles having an elastic/plastic ratio of 50% or less alleviate stress in the magnet molding and effectively function as a metal binder. If the metal binder is too soft, the adhesion strength becomes too small, so that it is preferably for even a soft metal to have an elastic/plastic ratio of about 2.5%. The elastic/plastic ratio is preferably 2.5-50%, more preferably 2.5-45%, and particularly preferably in the range of 2.5-40%. The elastic/plastic ratio of energy accompanying plastic deformation of the metal binder is defined as an index for the ease of deformation using the nanoindentation method.

In the nanoindentation method, a diamond triangular pyramid indenter is pushed (press fit) onto the surface of a sample placed on the base of an experimental device up to a certain load, after which the relationship (press-fit (load)-unload curve) between the load (P) and the displacement (press-fit depth h) until the indenter is removed (unloaded) is measured. The press-fit (load) curve reflects the elastoplastic deformation behavior of the material, and the unload curve can be obtained from the elastic recovery behavior. Then, the area surrounded by the load curve, the unload curve, and the horizontal axis is the energy Ep consumed by the plastic deformation. In addition, the area surrounded by a vertical line drawn from the maximum load point of the load curve (press-fit depth h) to the horizontal axis and the unload curve is the energy Ee absorbed by the elastic deformation. From the foregoing, the elastic/plastic ratio of energy accompanying the plastic deformation of particles is obtained as: elastic/plastic ratio=Ee/Ep×100 (%). The numerical value obtained when evaluating at a press-fit depth of 50-100 nm was used for the elastic/plastic ratio. For example, the Zn particles used in the examples have an elastic/plastic ratio of 50% or less.

As described above, the metal binder is preferably a nonmagnetic metal element (which is easily deformable with an elastic/plastic ratio of 50% or less) and specifically is a metal element other than Ni, Co, and Fe. Particularly, if it can be obtained as a metal powder, it is possible to use as metal particles as the binder material used in the metal binder. Specific examples of metals that are suitable for use as the metal binder include at least one type of soft metal or alloy selected from Zn, Cu, Sn, Bi, In, Ga, and Al. Of the above, Zn is particularly preferable. However, in the present embodiment, no limitation is imposed thereby. Specific examples of metals that are suitable for use as the binder material also include at least one type of soft metal or alloy selected from Zn, Cu, Sn, Bi, In, Ga, and Al in the same manner. Of the above, Zn particles are particularly preferable. This is because it is difficult to manufacture an Sm—Fe—N based metal bond magnet molding. An Sm—Fe—N based metal bond magnet molding with high coercive force is particularly difficult to manufacture, but it becomes possible to manufacture an Sm—Fe—N based magnet molding with high density by adding Zn particles to the coated magnetic particles described above and carrying out compaction molding. Preferably, by further heat treating of the magnet molding, the Zn binder in the magnet molding reacts with the Sm—Fe—N (magnetic particles) and it becomes possible to obtain an Sm—Fe—N based metal bond magnet molding with high coercive force. The molding conditions and the heat treatment conditions above will be described in the fourth embodiment.

Third Embodiment (III) Method of Producing Coated Magnetic Particles

The third embodiment of the present invention is a method of producing the coated magnetic particles (first embodiment). In the method of producing the coated magnetic particles of the present embodiment, while magnetic particles are being prepared by fine pulverization, an oxide layer coating with a film thickness of 1-20 nm is formed on the surface of the magnetic particles, and an organic layer coating with a film thickness of 1-100 nm is formed on the outer side of the oxide layer. The coated magnetic particles as the product (or raw material) are obtained in this manner. The method of producing the coated magnetic particles of suitable Sm—Fe—N magnetic particles (core portions) will be described below by means of examples. However, film-coated magnetic particles of magnetic particles (core portions) of other alloy compositions can also be produced in the same manner by appropriately interchanging the rare earth elements, the transition metal elements, and the non-metal elements.

(1) Mother Alloy Synthesis Step (S1)

In the mother alloy synthesis Step (S1), the desired raw material alloy can also be produced in an inert gas atmosphere, an arc melting furnace, a high-frequency furnace, or by the liquid rapid-quenching method. The composition of the Sm—Fe raw material alloy is preferably such that Sm is in the range of 20-30 wt %, and Fe is in the range of 80-70 wt %. If the Sm in the Sm—Fe raw material alloy is 20 wt % or more, it is possible to suppress the presence of the α-Fe phase in the alloy, which is excellent in terms of being able to obtain high coercive force. In addition, if the Sm is 30 wt % or less, there is the excellent effect of being able to obtain a high residual magnetic flux density.

When using a high frequency furnace or an arc melting furnace, Fe tends to precipitate when the alloy is solidified from a molten state, which causes a deterioration of the magnetic properties, particularly coercive force. Therefore, it is effective to eliminate the Fe single phase and to carry out annealing for the purpose of improving the crystallinity and making the composition of the alloy uniform. The effect of this annealing process is remarkable when carried out at 800° C.-1300° C. An alloy produced in this manner has favorable crystallinity compared with when the liquid rapid-quenching method or the like is used, and has a high residual magnetic flux density.

An alloy of the target composition can be produced by alloy production methods such as the liquid rapid-quenching method, roll rotation method, or the like. However, if the cooling rate is high, the alloy becomes amorphous, and there are cases in which the residual magnetic flux density and the coercive force do not increase as much as with other methods. A post-treatment such as annealing (the effect of this annealing is remarkable when carried out at 800° C.-1300° C.) is necessary in this case as well.

By observing the structure of the obtained alloy (mother alloy), it is possible to identify the crystal grain size after heat treatment (annealing). When a typical 5 kg ingot is melted and heat-treated (annealed), crystal grains of a columnar structure having a width of about 50 μm-5 mm are obtained.

(2) Coarse Pulverization Step (S2)

The pulverization of this Step (S2) may be a method of preparing only coarse powder, such as with a coffee mill, a Braun mill, a stamp mill, a jaw crusher, or the like, in an inert gas atmosphere, and, depending on the conditions, a ball mill or a jet mill may also be used.

However, the pulverization of this Step (S2) is for uniformly carrying out nitriding during the next Step (S3), and in addition to the conditions therefor, it is important to have sufficient reactivity and to prepare a powder state in which oxidation does not notably progress. In the present step, coarse pulverization may be carried out until the average particle diameter of the coarsely pulverized alloy is about 20-500 μm.

In addition, by carrying out hydrogen storage and hydrogen release treatments in this Step (S2), it is possible to promote pulverization by means of the change in volume.

(3) Nitriding Step (S3)

As a method of nitriding the pulverized raw material mother alloy in the nitriding Step (S3), a method of heat-treating the raw material powder in an ammonia decomposition gas or a mixed gas of nitrogen and hydrogen is effective. The nitrogen amount contained in the alloy can be controlled by the heating temperature and the treatment time.

While the mixing ratio of nitrogen, hydrogen, and ammonia can be changed in relation to the treatment conditions, the partial pressure of ammonia gas at 0.02-0.75 atm is particularly effective, and the treatment temperature in the range of 200-650° C. is preferable. If the temperature is 200° C. or more, it is possible to secure a sufficient nitrogen penetration rate, and if 650° C. or less, there is the excellent effect of exhibiting high magnetic properties without iron nitrides being generated. In addition, it is preferable to reduce the partial pressure of oxygen and the dew point as much as possible. In the method of carrying out heat treatment in a mixed gas of nitrogen and hydrogen as well, the treatment temperature is preferably in the range of 200-650° C. The mixing ratio of the mixed gas of nitrogen and hydrogen may be any mixing ratio, and an $N_2$-1-99% by volume $H_2$ mixed gas, or the like, may be used, but $N_2$-20-90% by volume $H_2$ mixed gas is preferable. Coarse pulverization should be carried out such that the average particle diameter of the magnet coarse powder obtained in the present step becomes about 25-30 μm. This is because, in the case of a bead mill, for example, in the case of IPA in combination with a solvent to ensure fluidity, the appropriate average particle diameter of the magnet coarse powder is about 25-30 μm.

Steps (1) to (3) are optional; the Sm—Fe—N based alloy powder (magnet coarse grains) with a low oxygen concentration obtained in steps (1) to (3) above may be replaced with a commercially available product, or be produced by other methods. For example, an Sm—Fe—N based magnet coarse powder to be used, which is a suitable magnet coarse powder, can be obtained by producing an Sm—Fe based alloy powder from, for example, samarium oxide and iron powder by the reduction diffusion method and by applying a heat treatment at 600° C. or less thereto in an atmosphere of $N_2$ gas, $NH_3$ gas, or a mixed gas of $N_2$ and $H_2$ gases, to produce Sm—Fe—N. In addition, it is also possible to use a material obtained by applying a nitride treatment to a powder obtained by producing an Sm—Fe alloy by the melting method, then subjecting the alloy to coarse pulverization.

(4) Fine pulverization Step (S4)=oxygen layer and organic layer forming step In the fine pulverization Step (S4), the coarse Sm—Fe—N based alloy powder (magnet coarse powder) with a low oxygen concentration obtained in steps (1) to (3) above (or a commercially available product, or a magnet coarse powder obtained by other methods described above) is pulverized (finely pulverized) to a predetermined average particle diameter in an inert gas atmosphere and dried. A low-oxygen Sm—Fe—N based alloy powder of about 20 μm obtained by the melt diffusion method may be used as well, which can achieve the same results.

As the fine pulverization method for bringing the magnet coarse powder to the desired size in the present Step (S4), wet milling with a ball mill or a bead mill is most effective, but it is also possible to carry out dry milling with such methods as a cutter mill or a jet mill. Dry milling is advantageous in that the finely pulverized magnetic particles are not likely to contain impurities. Wet milling is favorable in that the coercive force of the obtained magnet molding is increased since it is possible to finely pulverize the magnetic particles into an average particle diameter of 2 μm or less. From the standpoint of forming an oxide layer coating on the surface of the magnetic particles and forming an organic layer coating on the outer side of the oxide layer, while the magnetic particles are being prepared by fine pulverization, the wet milling described above is preferable. Furthermore, if necessary, the finely pulverized coated magnetic particles (or magnetic particles) may be sorted with a mesh, or the like. The particle diameter of the sorted coated magnetic particles (or magnetic particles) is measured by the laser diffraction method, and, if necessary, further sorting may be carried out. It is thereby possible to obtain coated magnetic particles (or magnetic particles) having the desired size (average particle diameter). The method of forming the oxygen layer and the organic layer coating while dry milling will be described below (including the subsequent steps) by means of examples. However, in the present Step (S4), dry milling may be carried out to form magnetic particles (core portions), after which oxidation treatment may be separately carried out in an inert gas atmosphere having the desired oxygen concentration, to form an oxide layer on the surface (inner side) of the magnetic particles. Furthermore, thereafter, an organic layer may be formed on the outer side of the oxide layer using a solution containing organic substances.

In the case of carrying out wet milling in the present Step (S4), by controlling the water content of the solvent and the oxygen concentration of the atmosphere at the time of drying (in the next step), it is possible to obtain Sm—Fe—N based magnetic particles, on the surface of which is formed an oxide film (oxide layer) having an appropriate film thickness (1-20 nm). From the standpoint of forming an oxide layer with a film thickness of 1-20 nm, since an extremely high oxidation suppression effect can be maintained during pulverization by dehydrating the water content of the solvent used for wet milling, it is possible to suppress the thickness of the oxide layer so that it remains thin. In this regard, the water content of the solvent is preferably 0.01-3.0 wt %, and more preferably in the range of 0.01-1.0 wt %, with respect to the total amount of solvent. From the standpoint of uniformly oxidizing the entire particle surface, it is preferable if the water content of the solvent used for wet milling is 0.01 wt % or more, and there is the excellent effect that it becomes a simple matter to control the film thickness of the oxide layer formed on the surface of the magnetic particles (inner side) to 1 nm or more. From the standpoint of suppressing a rapid oxidation reaction or an excessive oxidation reaction, it is preferable if the water content of the solvent used for the wet milling is 3.0 wt % or less, and there is the excellent effect that it becomes a simple matter to control the film thickness of the oxide layer formed on the surface of the magnetic particles (inner side) to 20 nm or less. The oxygen concentration of the atmospheric gas during drying (in the next step) will be described in the next step.

The solvent used for the wet milling is preferably an anhydrous organic solvent, and from the standpoint of controlling the film thickness of the oxide layer, it is preferable to set the water content in the (organic) solvent to be in the range defined above. Furthermore, dehydrated alcohols (organic solvents) are preferable. Here, while it is stated that dehydrated alcohols (organic solvents) are preferable, from the standpoint of controlling the film thickness of the oxide layer, it is preferable to set the water content in the alcohols (organic solvents) to be in the range defined above. In addition, since the flowability of the slurry is impaired by centrifugal force in a solvent having a markedly different specific gravity with respect to the specific gravity of the magnetic particles, it is necessary to select a solvent having an appropriate specific gravity with which the flowability can be ensured . In this regard, the specific gravity of the solvent is preferably 0.05-1.5 times, and more preferably 0.1-0.3 times the specific gravity of the magnetic particles, and, for example, an alcohol (organic solvent) with a carbon number of 1-10 may be suitably used. Solvents that satisfy the requirements (conditions) described above are preferable, and alcohols (organic solvents) with a carbon number of 1-6 are more preferable, as the solvent that can be used when carrying out wet milling. Specific examples include alcohols such as methanol, ethanol, 2-propanol, isopropyl alcohol (IPA), and 1-butanol, esters such as ethyl acetate, butyl acetate, propylene glycol monomethyl ether acetate, and propylene glycol monoethyl ether acetate, ethers such as diethyl ether, propylene glycol monomethyl ether, and ethylene glycol monoethyl ether, amides such as dimethylformamide and N-methylpyrrolidone, and ketones such as acetone, methyl ethyl ketone, acetylacetone, and cyclohexanone. These organic solvents may be used alone or in combination of two or more types. From the standpoint of environmental conditions/, ease of operation, and the like, it is preferable to use alcohols such as methanol, ethanol, 2-propanol, isopropyl alcohol, and 1-butanol, or a mixed solvent of alcohols and ethyl acetate, etc., as the solvent described above.

In addition, in the case of carrying out wet milling with a bead mill, or the like, in the present Step (S4), it is possible to efficiently form an organic layer with a film thickness of 1-100 nm on the outer side of the oxide layer on the surface of the magnetic particles, by adding a lubricant to the solvent of the slurry. It is necessary to increase the amount of added lubricant as the particle size becomes finer, in accordance with the particle diameter of the target magnetic particles, but usually, an addition of 0.1-20 wt % is preferable, and a range of 1-10 wt % is more preferable. If the amount of added lubricant is 0.1 wt % or more, it becomes a simple matter to control the film thickness of the organic layer formed on the outer side of the oxide layer to 1 nm or more. Thus, there is the excellent result that it is possible to obtain a lubrication effect, an antioxidant action, and a binding prevention effect between magnetic particles (core portions) during solidification molding. If the amount of added lubricant is 20 wt % or less, it is possible to suppress an excess oxidation reaction and it becomes a simple matter to control the film thickness of the organic layer formed on the outer side of the oxide layer to be 100 nm or less. Thus, there is the is excellent result that it is possible to obtain a lubrication effect, an antioxidant action, and a binding prevention effect between magnetic particles (core portions) during solidification molding.

For the lubricant, it is preferable to use an organic liquid having a viscosity of 10 mPa·s (10 cP) or less, preferably of 0.1-8.0 mPa·s, which is not easily ignitable and easy to dry. Examples include octanoic acid, ethyl octanoate, methyl octanoate, ethyl laurate, butyl laurate, and methyl laurate. In particular, fatty acid esters can be used. It is preferable to use these lubricants in that it is thereby possible to obtain a lubrication effect, an antioxidant action, and a binding prevention effect between magnetic particles (core portions) during solidification molding. Other than the examples described above, compounds specifically exemplified as organic substances that constitute the organic layer of the first embodiment may be used as the lubricant.

In addition, in the case of carrying out wet milling with a bead mill, or the like, in the present Step (S4), it is possible to efficiently form an organic layer with a film thickness of 1-100 nm on the outer side of the oxide layer on the surface of the magnetic particles, by adding a lubricant to the solvent of the slurry. From the standpoint of securing the amount of added grinding media while ensuring the flowability of the slurry, the content amount of the magnet coarse powder in the slurry is usually preferably 20-60 wt %, and more preferably in the range of 30-50 wt %. If the content amount of the magnet coarse powder is 20 wt % or more, there is the advantage that the amount of magnet coarse powder to be charged can be increased. If the content amount of the magnet coarse powder is 60 wt % or less, the amount of added grinding media is increased, and there is the excellent effect of improving the milling speed.

From the foregoing, the organic layer described above is preferably formed in a mixed solution of a fatty acid ester and alcohol. In the wet milling step for miniaturization of the magnetic particles, by utilizing a fatty acid ester suitable as a lubricant and an alcohol suitable as a solvent (organic solution) for slurrying the magnetic particles, it is possible to execute the pulverization step and the forming step of the organic layer (and the oxide layer) the forming step of the organic layer (and the oxide layer) in the same step, to thereby reduce the number of steps. In addition, since an extremely high oxidation suppression effect can be maintained during pulverization by dehydrating the water content of the solvent, it is possible to suppress the thickness of the oxide layer so as to remain thin. With respect to the mixing ratio of the fatty acid ester and the alcohol, the content amount of the fatty acid ester (lubricant) in the mixed solution can be set to 0.1-10 wt %, which is superior in terms of being able to effectively exhibit the effects described above.

(5) Drying Step (S5)

In the drying Step (S5), the organic solution on the surface of the coated magnetic particles obtained by wet milling may be washed off using IPA, hexane, or acetone, and replaced with a highly volatile solution, and then left at room temperature in a glove box of an inert gas atmosphere to be dried. At this time, the dew point of the inert gas atmosphere is preferably suppressed to −10° C. or less, and the oxygen concentration is preferably suppressed to 0.001-1 vol %. This is because, by controlling the water content of the solvent in the wet milling of the previous Step (S4) and the oxygen concentration of the atmosphere at the time of drying in the present Step (S5), it becomes possible to obtain magnetic particles on the surface of which is formed an oxide film (oxide layer) of appropriate film thickness (1-20 nm). Accordingly, the oxygen concentration of the inert atmospheric gas during drying in the present Step (S5) is preferably 0.001-1 vol %, and more preferably in the range of 0.005-0.02 vol %, with respect to the total amount of atmospheric gas. If the oxygen concentration in the atmospheric gas during drying is 0.001 vol % or more, it is possible to promote an oxidation reaction while utilizing relatively inexpensive gas and equipment, and there is the excellent result that it becomes a simple matter to control the film thickness of the oxide layer formed on the surface of the magnetic particles (inner side) to 1 nm or more. If the oxygen concentration of the atmospheric gas during drying is 1 vol % or less, it is possible to uniformly promote the oxidation reaction while suppressing the oxidation rate, and there is the excellent result that it becomes a simple matter to control the film thickness of the oxide layer formed on the surface of the magnetic particles (inner side) to 20 nm or less.

In the present Step (S5), in order to prevent the temperature from dropping excessively during drying due to the heat of vaporization, drying may be carried out while heating with a hot plate; however, since oxidation progresses if the temperature becomes too high, it is desirable to keep the temperature at or below 60° C.

It is possible to produce the coated magnetic particles with the steps (S1) to (S5) described above. The size (average particle diameter) of the prepared coated magnetic particles is the same as the size (average particle diameter) of the coated magnetic particles of the first embodiment. The method for measuring the average particle diameter of the coated magnetic particles can be obtained in the same manner as in the method described in the first embodiment.

(6) Examination of the Coated Magnetic Particles, Etc.

It was confirmed that the coated magnetic particles of the present embodiment could be produced with the above-described steps (S1) to (S5) by the following tests.

(6-1) Measurement (Examination) of the Average Particle Diameter

Here, the average particle diameter of the coated magnetic particles can be subjected to grain size analysis (measured) by, for example, SEM (scanning electron microscope) observation and TEM (transmission electron microscope) observation. There are cases in which the coated magnetic particles or the cross sections thereof include powder that is of an indefinite shape, in which the aspect ratios (aspect ratios) are different, rather than spherical or circular shapes (cross-sectional shape). Therefore, since the shapes of the coated magnetic particles (or the cross-sectional shapes thereof) are not uniform, the average particle diameter described above is represented by the average value of the absolute maximum lengths of the cross-sectional shapes of the magnetic particles in the observation image (several to several tens of fields of view). The absolute maximum length is the maximum length from among the distances between two arbitrary points on the contours of the coated magnetic particle (or the cross-sectional shape thereof).

(6-2) Measurement (Examination) of the Oxygen Concentration

The oxygen concentration of the coated magnetic particles can be measured using an oxygen/nitrogen analyzer by the infrared absorption method. In this examination, it is possible to confirm the alloy composition of the magnet coarse powder by inspecting the oxygen concentration of the allow powder (magnet coarse powder) after the nitriding of Step (S3). Furthermore, the oxygen concentration may be measured (examined) for the purpose of ascertaining the approximate production amount of the oxide layer.

(6-3) Measurement (Examination) of the Surface Coating Condition

The surface condition of the coated magnetic particles can be identified by cutting out a cross section of the resin-embedded coated magnetic particles by the FIB method (focused ion beam processing method), and carrying out TEM observation. It is thereby possible to find the average particle diameter of the magnetic particles (core portions) of the coated magnetic particles, the film thickness of the oxide layer, and the film thickness of the organic layer. In addition, by forming a vapor-deposited film with Au, or the like, on the surface of the coated magnetic particles in advance, it is possible to identify the outermost surface of the coated magnetic particles (the outermost surface of the organic layer even after resin embedding), even after the sample is processed. Furthermore, the state of the surface of the coated magnetic particles in the depth direction (radial direction toward the center of the particle) can be analyzed by XPS (X-ray photoelectron spectroscopy). From the above, it is possible to find the average particle diameter of the magnetic particles (core portions) of the coated magnetic particles, the film thickness of the oxide layer, and the film thickness of the organic layer. The average values calculated for the particle diameter of the core particles, the film thickness of the oxide layer and the film thickness of the organic layer, that are obtained by observing the particle diameter of the core particles, the film thickness of the oxide layer and the film thickness of the organic layer, in several to several tens of fields of view, using observation means such as transmission electron microscope (TEM), are employed as the average particle diameter of the core portions, the film thickness of the oxide layer and the film thickness of the organic layer. Twenty or more observation fields of view were secured to obtain the average values.

Fourth Embodiment (IV) Method of Producing the Magnet Molding

The method of producing the metal bond magnet molding according to the second embodiment described above will be explained.

The present embodiment concerns a method of producing a metal bond magnet molding in which the coated magnetic particles of the first embodiment are subjected to solidification molding in a die molding, without using an organic binder (resin binder), but using metal particles, preferably Zn particles, that are metal binder materials. Preferably, a mixture of the Zn particles and coated magnetic particles at a temperature of 600° C. or less is press-molded at 1-5 GPa. With this configuration, it is possible to obtain the magnet molding having the effect of the second embodiment described above. Furthermore, diffusion of Zn, etc., which is a metal binder, through the boundary layer of the magnetic particles becomes facilitated, and it becomes possible to cause the Zn, etc., to diffuse so as to surround the magnetic particles (particularly Sm—Fe—N based magnetic particles), which improves the coercive force. It is thereby possible to provide a metal bond magnet molding with higher coercive force. The method of producing the bond magnet molding of the present embodiment will be described below, and primarily concerns the case in which Zn (particles) are used as a binder, and Sm—Fe—N based magnetic particles are used as the magnetic particles (core portions).

The method of producing the bond magnet molding of the present embodiment comprises a preparation Step (S11), a hot or cold compaction molding Step (S12), and a heat treatment Step (S13). The preparation Step (S11) is a step for preparing a mixture of the coated magnetic particles of the first embodiment described above, and metal particles, which constitute the metal binder as an optional component. In the hot or cold compaction molding Step (S12), a mixture of the metal particles and the coated magnetic particles at an appropriate temperature (preferably a temperature of 600° C. or less), is subjected to pressurization (compaction) molding in a molding die at an appropriate pressure (preferably with a molding surface pressure of 1-5 GPa), to obtain the magnet molding of the second embodiment. Alternatively, the metal bond magnet molding of the second embodiment may be obtained by further carrying out a heat treatment Step (S13). In the heat treatment Step (S13), the magnet molding obtained in the hot or cold compaction molding Step (S12) is heated for 1-120 minutes at a temperature of 350-600° C., to obtain the magnet molding of the second embodiment. The heat treatment Step (S13) is optional. The metal bond magnet molding, which is the product, is obtained in this manner.

(1) Preparation Step (S11)

In the preparation Step (S11), it is preferable to prepare a mixture in which the coated magnetic particles of the first embodiment, which are the raw material, and metal particles, which constitute a metal binder, are blended, without using an organic binder (resin binder), to be provided to the subsequent Step (S12). The coated magnetic particles of the first embodiment, which are the raw material, can be prepared (prepared) with the manufacturing method of the third embodiment. In addition, the metal particles, which constitute the metal binder, are optional components, and may be prepared, or a commercially available product (including custom products) may be used therefor. Additionally, the same metal binder described in the first embodiment may be used as the metal binder.

In the present step, it is preferable to prepare a mixture in which metal particles, which are the optional component metal binder material, are blended with the coated magnetic particles prepared by means of the manufacturing method of the third embodiment. By blending metal particles with the coated magnetic particles described above, it is possible to carry out molding into a high density, and to suppress binding between the magnetic particles, at the time of the hot or cold compaction molding step of the subsequent step. Accordingly, it is possible to increase the density, improve the residual magnetic flux density (Br), and to obtain a magnet molding with high coercive force. In addition, by blending the metal particles (metal binder), the moldability is improved due to the binding together of the metal binder components during hot or cold compaction molding in the next step. Therefore, the obtained magnet molding will have excellent mechanical strength. Furthermore, since the metal particles (metal binder) alleviate the internal stress that is generated at the time of molding, it is possible to obtain a magnet molding with few defects. Furthermore, by using a metal (particle) binder, it is possible to obtain a magnet molding that can be used in a high temperature environment. When preparing (preparing) a mixture by blending metal particles, which are the metal binder material, with the coated magnetic particles, the coated magnetic particles and the metal particles should be mixed together with a mixer, etc., until a uniform mixture is obtained. Since it is only necessary to use a considerably small amount of the metal particles (metal binder material) compared with an organic substance binder (resin binder) in a resin bond magnet, there is the excellent effect that there is no risk that the metal binder will affect the magnetic properties and cause a deterioration thereof.

The coated magnetic particles described above are the same as the coated magnetic particles of the first embodiment. The metal particles described above are the same as the metal binder (metal particle) described in the first embodiment.

The steps after the preparation step, that is, the steps from the preparation step to the hot or cold compaction molding step (further heat treatment step) are preferably executed in an inert atmosphere. In an inert atmosphere means in an atmosphere that is essentially free of oxygen. Since the performance of a magnet is related to the amount of impurities, it is possible to prevent an increase in the amount of impurities, such as oxides, and deterioration in the magnetic properties, in an inert atmosphere. Furthermore, it is possible to prevent severe deterioration of the magnetic properties due to oxidation, and to prevent the particles from burning, when heating the finely pulverized coated magnetic particles in the molding step and the heat treatment step.

Examples of an inert atmosphere include inert gas atmospheres such as nitrogen, rare gas, or the like. In an inert atmosphere, the oxygen concentration is preferably 100 ppm or less, more preferably 50 ppm or less, and even more preferably 10 ppm or less.

(2) Hot or Cold Compaction Molding Step (S12)

The present Step (S12) is a step in which a mixture of the metal particles, which are optional components, and the coated magnetic particles at an appropriate temperature (preferably a temperature of 600° C. or less), is subjected to pressurization (compaction) molding in a molding die at an appropriate pressure (preferably with a molding surface pressure of 1-5 GPa), to obtain the bond magnet molding of the second embodiment. The present embodiment has the benefit that it is possible to suppress thermal decomposition of the magnetic particles by molding at a temperature of 600° C. or less, even when using an $Sm_2Fe_{17}N_3$ alloy as the core portion of the coated magnetic particles. In addition, by subjecting the metal particles, which are optional components, and the coated magnetic particles to a temperature of 600° C. or less (hereinafter also referred to as mixture of magnetic particles, etc.) to carry out pressurization (compaction) molding at a high surface pressure of 1-5 GPa, deterioration of the magnetic properties, which occurs when forming a bulk magnet by sintering the magnetic particles at a high temperature, does not occur. Therefore, it is possible to obtain a magnet molding having the effect of the second embodiment described above while maintaining the excellent magnetic properties of the magnetic particles, particularly Sm—Fe—N based magnetic particles. That is, it is possible to suppress binding between the magnetic particles even when formed at high density without being solidified with an organic substance (binder). It is thereby possible to obtain a magnet molding in which both the residual magnetization (Br) and the coercive force (Hc) are improved. Here, the mixture of magnetic particles, etc., described above shall include forms that do not include the optional component metal particles (forms composed of coated magnetic particles).

In addition, in the present molding Step (S12), the mixture of magnetic particles, etc., described above is preferably subjected to pressurization (compaction) molding in a state of being heated to a temperature of 600° C. or less at which the magnetic properties do not greatly change, or a state of not being heated. When obtaining a magnet molding having a high density (for example, a relative density of 50% or more, preferably 80% or more), the method of molding is preferably die molding. Specifically, while sufficient molding is possible even by the cold compaction molding method, in which pressurization (compaction) molding is carried out at room temperature (in a state of not being heated), the hot compaction molding method in which pressurization (compaction) molding is carried out in a heated state is superior in that a magnet molding can be obtained at a more reduced molding surface pressure. Therefore, in the present molding step, using the hot compaction molding method is superior in terms of the ability to dramatically extend the service life of the metal mold (molding die), increased productivity, and suitability for industrial production. Furthermore, in the present molding step, by using the hot compaction molding method described above, it is possible to improve the density of the obtained magnet molding, compared to when compaction molding is carried out at the same molding surface pressure as the cold compaction molding method (at room temperature). In this regard, when the hot compaction molding method described above is used in the present step, the temperature of the mixture of magnetic particles, etc., at the time of pressurization (compaction) molding is more preferably 50-500° C., and still more preferably in the range of 100-450° C. It is particularly preferably in the range of 100-250° C.

In the present Step (S12), it is preferable to obtain a magnet molding with high density (preferably, a relative density of 50% or more, more preferably 80% or more). The relative density of the magnet molding obtained in the present molding step is the same as the matter (content)

relating to the relative density of the magnet molding described in the second embodiment.

In addition, in the present molding Step (S12), it is possible to select a molding die suited to the particular use. Accordingly, if a molding die having the shape of the desired magnet molding is used, it is possible to use as a product, or in the subsequent step, almost as is, and it becomes possible to carry out a so-called near net shape molding with extremely tight processing tolerances. Therefore, the processing yield is good and the manufacturing step becomes simple; thus, the present embodiment is suitable for mass production. Furthermore, the present embodiment provides a magnet molding manufactured only by pressurization (compaction) molding, and the variation in the magnetic properties is less than that for the conventional manufacturing method, and thus excellent quality stability can be obtained.

In the present molding Step (S12), when using the hot compaction molding method described above, there is no particular limitation concerning how to heat the mixture of magnetic particles, etc., to 600° C. or less. The mixture of magnetic particles, etc., may be heated before charging into the molding die, or the mixture of magnetic particles, etc., may be heated together with the molding die after being charged in the molding die. In the present molding step, when using the hot compaction molding method described above, it is sufficient if the pressurization (compaction) molding is carried out in a state in which the mixture of magnetic particles, etc., is heated to 600° C. or less. Preferably, a cartridge heater is inserted and set in the molding die; it is thereby possible to heat the mixture of magnetic particles, etc., along with the molding die after charging the mixture of magnetic particles, etc., in the molding die. As the method of measuring the temperature of the mixture of magnetic particles, etc., it is possible to install a temperature sensor in the molding die and to carry out the following method. That is, after the molding die reaches a predetermined temperature, for a period of about 10 minutes until the entire mixture of magnetic particles, etc., reaches the same temperature, the molding die temperature is maintained, and the temperature of the molding die is regarded as the temperature of the mixture of magnetic particles, etc. Alternatively, high-frequency heating, etc., is also possible. When heating the mixture of magnetic particles, etc., together with the molding die, there is no risk of the mixture of magnetic particles, etc. cooling, and the production step also becomes simple, which is preferable. In addition, when heating only the mixture of magnetic particles, etc., in advance, the mixture of magnetic particles, etc., is heated to a predetermined temperature in an oven, or the like, and charged into the molding die. In this case, the production lead time is reduced, which is preferable. It is sufficient if the mixture of magnetic particles, etc., is heated to a temperature of 600° C. or less in a state of being charged in the molding die.

When the cold compaction molding method described above is used in the present molding Step (S12), the mixture of magnetic particles, etc., is charged in a molding die without heating the mixture of magnetic particles, etc., and the following pressurization (compaction) molding is carried out.

The pressurization (compaction) molding is preferably carried out (solidification molding) by subjecting the mixture of magnetic particles, etc., to a pressure (molding surface pressure) of 1-5 GPa. If the pressure (molding surface pressure) at the time of pressurization (compaction) molding is 1 GPa or more, it is possible to sufficiently form a magnet molding. If the pressure (molding surface pressure) at the time of pressurization (compaction) molding is 5 GPa or less, there is the excellent effect of extending the service life of the molding die (service life can be increased). From the standpoint of further extending the service life of the metal mold while obtaining a magnet molding with the desired magnetic properties (and which is further high density, for example with a relative density of 50% or more, preferably 80% or more), the pressure (molding surface pressure) at the time of pressurization (compaction) molding is more preferably in the range of 1.5-3.5 GPa. The method of pressurization (compaction) molding is not particularly limited and may be any method with which it is possible to apply the high surface pressure described above to a wide area that covers the metal mold of the magnet molding of desired size. Preferably, a high-power pressing machine used for casting can be used, and a hydraulic press machine, an electric press machine, an impact press machine, or the like may be used.

In the magnet molding obtained in the present molding step, the relative density is preferably 50% or more. If the relative density is 50% or more, the magnet molding would have sufficient flexural strength for use in electromagnetic devices, such as on-board motors, vehicle-mounted sensors, actuators, voltage conversion devices, and the like.

In the magnet molding obtained in the present step, the boundary layer of the magnetic particles (between the magnet particles) inside the molding is preferably an intermittent oxide, carbide, organic material, void, or a composite thereof, having a thickness of 1-20 nm. With this configuration, it is possible to maintain the high coercive force possessed by the magnetic particles (core portions) having a minute particle diameter, due to a nonmagnetic substance being interposed in the gaps between the magnetic particles (core portions).

Figure 1B:
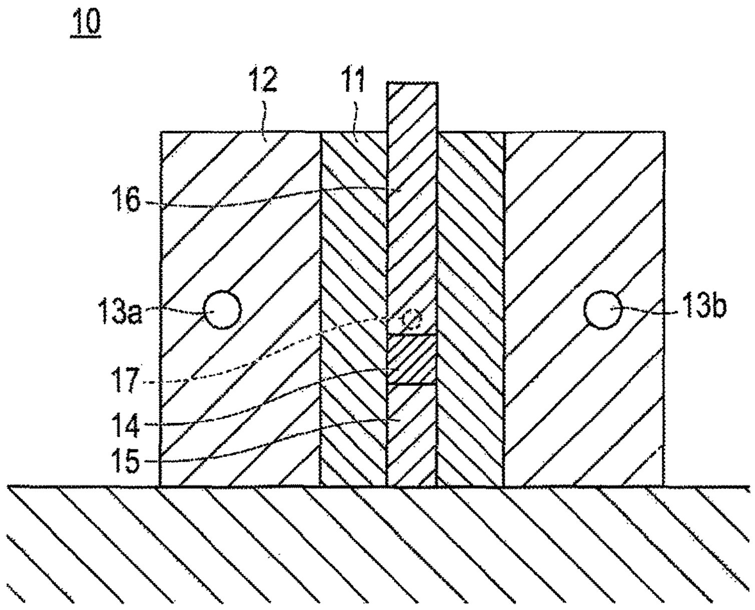
FIG. 1B is a cross-sectional view of the molding die of FIG. 1A as seen along section line 1B-1B.

The molding die is not particularly limited, as long as the molding die can withstand a high surface pressure of 1-5 GPa and a temperature of 600° C. or less, and any type may be used. FIG. 1A is a top view schematically illustrating a preferred example of a molding die, and FIG. 1B is a cross-sectional view taken along the A-A direction of FIG. 1A. In the molding die 10, an inner metal mold 11, having a cylindrical (top ring-shaped) circular outer shape, is formed of cemented carbide that can withstand a high surface pressure, and a cylindrical outer metal mold 12 is formed of a soft metal, as illustrated in FIG. 1A. In addition, the mixture of magnetic particles, etc. 14 is charged onto a lower metal mold 15 with a quadrangular prism shape in a central space of the inner metal mold 11, and an upper metal mold 16 with a quadrangular prism shape is inserted thereabove, as illustrated in FIG. 1B. The upper portion of the upper metal mold 16 projects from the upper surfaces of the metal molds 11, 12, such that the projecting portion of the upper metal mold 16 is pressed when pressurizing (pressing) the molding die 10 from above, and the mixture of magnetic particles, etc., therebelow is subjected to pressurization (compaction) molding, to thereby form a quadrangular prism shaped magnet molding. That is, by changing the spatial shape of the inner metal mold 11, it is possible to form (solidification molding) a magnet molding with a cylindrical shape, a polygonal prism shape, or the like. In addition, through-holes 13*a*, 13*b*, through which a cartridge heater is extended, are provided to the molding die, as illustrated in FIGS. 1A and 1B. The entire molding die is heated by the cartridge heater (not shown) in the through-holes 13*a*, 13*b* (or without heating), and pressure is applied from above by a hydraulic press, or the like, in a state in which the mixture of magnetic particles, etc. 14 in the molding space is maintained at 600° C. or less. In addition, a temperature sensor hole 17 is formed in the outer metal mold 12 such that the heating temperature can be monitored when the hot compaction molding method is used, and the temperature of the outer metal mold 12 is measured with a temperature sensor (not shown) in the temperature sensor hole 17, as illustrated in FIG. 1A. The temperature sensor hole 17 is formed at a height close to the upper surface of the mixture of magnetic particles, etc. 14, as illustrated in FIG. 1B. Therefore, after the heated outer metal mold 12, the inner metal mold 11, the lower metal mold 15, the upper metal mold 16, and the mixture of magnetic particles, etc. 14 are allowed to stand for a predetermined time until a thermal equilibrium state is reached, where the temperature indicated by the temperature sensor in the temperature sensor hole 17 can be regarded as the temperature of the mixture of magnetic particles, etc. 14.

(3) Heat Treatment Step (S13)

In the present heat treatment Step (S13), the formed (solidification molding) magnet molding is preferably heat treated after the hot or cold compaction molding Step (S12) described above. The heat treatment is particularly effective when heat treating the zinc-added Sm—Fe—N based magnet molding described in the second embodiment. By mixing zinc particles with coated magnetic particles and carrying out die molding, it is possible to produce an Sm—Fe—N based high-density compact (magnet molding). By heat treating this Sm—Fe—N based high-density compact (magnet molding), the zinc of the metal binder reacts with the Sm—Fe—N of the magnetic particle, which has the excellent effect that it is possible to produce an Sm—Fe—N based magnet molding (a heat-treated product of zinc-added Sm—Fe—N based magnet molding) with high coercive force. By reducing the densified region formed by the reaction product of Zn and Fe so as to not remain by heat treatment, diffusion of zinc through the boundary layer of the magnetic particles (between the magnetic particles) becomes facilitated, and it becomes possible to cause the zinc to diffuse so as to surround the Sm—Fe—N based magnetic particles, which improves the coercive force.

In the present heat treatment Step (S13), the formed (solidification molding) magnet molding is preferably heat for 30-60 minutes at a temperature that is equal to or greater than the melting point of Zn (417° C.) and equal to or less than the decomposition temperature of the magnetic particles (core portions), after the hot or cold compaction molding Step (S12) described above. It is more preferable that heating be performed for 15-120 minutes at a temperature of 420-500° C., and more preferably for 30-60 minutes at 430-460° C. While the heat treatment step is not essential, since it becomes possible to obtain magnetic properties close to the theoretical limit, execution thereof is preferable. In addition, in the case of a heat-treated product of a zinc-added Sm—Fe—N based magnet molding described in the second embodiment, by reducing the densified region formed by the reaction product of Zn and Fe so as to not remain by the heat treatment, it becomes a simple matter to cause the zinc to diffuse through the boundary layer of the magnetic particles (between the magnetic particles). Since it is thereby possible to cause the zinc to diffuse so as to surround the Sm—Fe—N based magnetic particles, the coercive force is improved. It is thereby possible to provide an Sm—Fe—N based metal bond magnet molding with a higher coercive force. Accordingly, the thickness of the densified region formed by the reaction product of Zn and Fe produced around the Zn binder inside the magnet molding obtained by heat treating the zinc-added Sm—Fe—N based magnet molding described in the second embodiment is preferably 5 μm or less. More preferably, it is 1 μm or less.

The method of heat treating the magnet molding is not particularly limited, and any method may be used as long as heating can be carried out at the above-described temperatures. Preferably, the magnet molding can be heated with the same method as the hot compaction molding method of the hot or cold compaction molding Step (S12). For example, in the case of heating both the molding die and the mixture of magnetic particles, etc., with a heater installed in the molding die in the hot compaction molding method of the molding Step (S12), it is possible to carry out heating using the same heater after the pressurization (compaction) molding. In addition, the heat treatment of the present Step (S13) may also be carried out by taking the magnet molding obtained in the molding Step (S12) out of the molding die and placing the magnet molding in a separate oven. In the present heat treatment step, the magnet molding is more preferably heated for 10-60 minutes at 380-480° C. In order to obtain a good effect from the present heat treatment step, it is preferable to set the heat treatment temperature in the present step higher than the (heating) temperature at the time of the pressurization (compaction) molding.

In the present heat treatment step, the relative density of the magnet molding obtained by heat treating the zinc-added Sm—Fe—N based magnet molding described in the second embodiment is preferably 80% or more. By increasing the density such that the relative density become 80% or more, the residual magnetization (Br) becomes excellent, diffusion of zinc through the boundary layer of the magnetic particles (between the magnetic particles) becomes facilitated, and it becomes possible to cause the zinc to diffuse so as to surround the Sm—Fe—N based magnetic particles, which improves the coercive force. It is thereby possible to provide a high-performance Sm—Fe—N based metal bond magnet molding with a higher coercive force and a high residual magnetic flux density. As described above, if the relative density is 80% or more in this manner, the magnet molding would have sufficient flexural strength for use in electromagnetic devices, such as on-board motors, vehicle-mounted sensors, actuators, voltage conversion devices, and the like.

According to the present embodiment, it is possible to obtain a magnet molding that satisfies the requirements of the first embodiment, produced with the manufacturing method described above (by executing each of the steps), in which the residual magnetic flux density Br is 0.9 T or more, the coercive force He is 550 kA/m or more, and the maximum energy product (BH) max is 171 kJ/$m^3$. More preferably, it is desirable if the residual magnetic flux density is 0.80 T or more, the coercive force is 1100 kA/m or more, and the maximum energy product is 173 kJ/$m^3$ or more. The residual magnetic flux density, the coercive force, and the maximum energy product are measured according to the method of measurement described in the examples.

<Another Aspect A of the Fourth Embodiment>

Another aspect A of the fourth embodiment of the method of producing the metal bond magnet molding according to the fourth embodiment comprises a hot or cold compaction molding Step (S22) in a magnetic field instead of the hot or cold compaction molding Step (S12) of the fourth embodiment. That is, a metal bond magnet molding as a product is obtained by a preparation Step (S21), a hot compaction molding in magnetic field Step (S23), and a heat treatment Step (S23). The preparation Step (S21) and the heat treatment Step (S23) are respectively the same as the preparation Step (S11) and (S13) of the fourth embodiment, and the heat treatment Step (S23) is optional. Therefore, the hot or cold compaction molding in magnetic field Step (S22) will be described below.

(2') Hot Compaction Molding in Magnetic Field Step (S22)

The present Step (S22) is a step in which a mixture of magnetic particles, etc., at an appropriate temperature (preferably a temperature of 600° C. or less) is subjected to pressurization (compaction) molding in a molding die at an appropriate pressure (preferably with a molding surface pressure of 1-5 GPa) in an appropriate magnetic field (preferably, a magnetic field of 6 kOe or higher) to obtain the bond magnet molding of the third embodiment. Other than carrying out the hot or cold compaction molding step in a magnetic field, the present molding step (S22) is the same as the hot or cold compaction molding Step (S12) of the fourth embodiment.

In the present embodiment A, the core portions of the coated magnetic particles (particularly the Sm—Fe—N based magnetic particles) used for the mixture of magnetic particles, etc., are preferably anisotropic. By carrying out hot or cold compaction molding in a magnetic field using coated magnetic particles having anisotropic magnetic particles (particularly Sm—Fe—N based magnetic particles), the molding is executed in a state in which the easily magnetized axes of the magnet particles are oriented in the magnetic field direction. Therefore, the obtained magnet molding will become an anisotropic magnet molding having a higher residual magnetic flux density. The magnetic field to be applied is more preferably 17 kOe or higher. While an upper limit is not particularly limited, since the effect of aligning the easily magnetized axes will saturate, it is preferable that 25 kOe or less be used.

The method of carrying out the hot or cold compaction molding step in a magnetic field (S22) is not particularly limited as long as a suitable magnetic field of 6 kOe or higher can be provided. For example, it is possible to install a known magnetic field orienting device around the molding die and carry out pressurization (compaction) molding in a state in which a magnetic field is applied. An appropriate magnetic field orienting device may be selected from known magnetic field orienting devices, according to the shape, dimensions, and the like, of the desired magnet molding. The method of applying the magnetic field to be employed may be either of a method of applying a static magnetic field, such as an electromagnet disposed in a normal magnetic field forming device, and a method of applying a pulsed magnetic field using an alternating current.

The desired metal bond magnet molding is obtained as described above. Alternatively, the desired metal bond magnet molding may be obtained by further carrying out a heat treatment Step (S23) as needed.

<Yet Another Aspect B of the Fourth Embodiment>

Yet another aspect B of the fourth embodiment of the method of producing the metal bond magnet molding according to the fourth embodiment comprises a preliminary compression molding Step (S32) in a magnetic field and a hot or cold compaction molding Step (S33), instead of the hot or cold compaction molding Step (S12) of the fourth embodiment. The preparation Step (S31) and the heat treatment Step (S34) are respectively the same as the preparation Step (S11) and (S13) of the fourth embodiment, and the heat treatment Step (S34) is optional. That is, a metal bond magnet molding as a product is obtained by means of a preparation Step (S31), a preliminary compression molding in magnetic field Step (S32), a hot compaction molding Step (S33), and a heat treatment Step (S34). Therefore, the preliminary compression molding in magnetic field Step (S32) will be mainly described below.

(2a") Preliminary Compression Molding in Magnetic Field Step (S32)

The present embodiment B comprises a preliminary compression molding Step (S32), in which a mixture of magnetic particles, etc., is compression molded in an appropriate magnetic field (preferably a magnetic field of 6 kOe or higher) before the hot or cold compaction molding Step (S33), to obtain a magnet molding having an appropriate relative density (preferably, a relative density of 30% or more). In the present embodiment B, an operation is carried out in which a mixture of magnetic particles, etc., is inserted, for example, into a metal mold used in the next step, and a magnetic field is applied from the outside of the metal mold to align the crystal orientation of the magnetic particles in the coated magnetic particles (particularly Sm—Fe—N based magnetic particles). In the subsequent hot or cold compaction molding step, a high surface pressure pressing machine is used. Therefore, since a large space is required to attach a magnetic field orienting device to such a large device, there are cases in which practical application is difficult. Therefore, a magnetic field orientation machine is attached to a low surface pressure pressing machine, and a precompressed molding with a relative density of about 30% is prepared in advance. Thereafter, the precompressed molding is heated, or left unheated, and subjected to hot or cold compaction molding with a high surface pressure pressing machine. This is because, although the number of steps will be increased, in consideration of mass production, there are cases in which providing a preliminary compression molding step is preferable. By carrying out a preliminary compression molding step, the magnetic particles of the coated magnetic particles exhibiting anisotropy (particularly Sm—Fe—N based magnetic particles) are put in a state in which the easily magnetized axes are aligned in the precompressed molding. Therefore, the magnet molding obtained through the subsequent hot or cold compaction molding Step (S33) will also have the easily magnetized axes aligned, and the magnet molding will have a higher residual magnetic flux density.

In the present preliminary compression molding Step (S32), a precompressed molding having a relative density of 30% or more is formed, since it is sufficient to obtain a molding with a relative density to the extent to which the molding does not break during transport and handling. In the case of a precompressed molding with a relative density of 30% or more, the magnetic particles (particularly Sm—Fe—N based magnetic particles) in the coated magnetic particles in which the easily magnetized axes are aligned with the direction of the magnetic field will not move, and the easily magnetized axes will be maintained in an aligned state. The upper limit value of the relative density of the magnet molding is not particularly limited, but is 50% or lower. That is, since the molding in the present Step (S32) is a provisional molding (precompressed molding), the provisional molding pressure in the present step is preferably about 49-490 MPa. A molding with the above-described relative density is thereby obtained. The provisional molding temperature in the present step is not particularly limited, but considering the ease and cost of work, compression is preferably carried out in a working environment temperature. In addition, in terms of the working environment, it is necessary to pay attention to such environmental factors as humidity, in order to prevent deterioration due to oxidation. It is better that the orientation magnetic field to be applied be larger, but it is normally 0.5 MA/m (≈6 kOe) or more, and preferably 1.2-2.2 MA/m.

The method of applying a magnetic field is not particularly limited, and a pressing machine may be installed in the magnetic field orientation machine. The same magnetic field orientation machine as the other aspect A of the fourth embodiment described above may be used as the magnetic field orientation machine. In addition, the pressing machine is also not particularly limited, and any type of pressing machine with which it is possible to obtain a precompressed molding of the mixture of magnetic particles, etc., with a relative density of 30% or more may be used. For example, a hydraulic pressing machine or an electric pressing machine may be used, but a pressing machine with a lower surface pressure than the pressing machine used in the hot or cold compaction molding step may be used.

The obtained precompressed molding is subjected to pressurization (compaction) molding in the same manner as the hot or cold compaction molding Step (S12) of the fourth embodiment, in the subsequent hot or cold compaction molding Step (S33) Furthermore, a metal bond magnet molding can be obtained by carrying out a heat treatment Step (S34) in the same manner as the heat treatment Step (S13) of the fourth embodiment as needed.

(Evaluation of the Magnetic Properties)

The evaluation of the physical properties of the magnet molding of the third embodiment and the magnet molding obtained in the fourth embodiment (including aspects A and B) can be carried out with the following method. The magnetic density can be calculated from the mass and dimensions of the magnet molding. The magnet characteristics (coercive force, residual magnetic flux density, and maximum energy product) can be measured using a pulsed excitation type magnetometer MPM-15 manufactured by Toei Industry Co., Ltd., by magnetizing a test piece of the magnet molding in advance with a magnetizing field of 10 T, and then measuring using the BH measuring instrument TRF-5AH-25Auto manufactured by Toei Industry Co., Ltd.

(V) Application of the Metal Bond Magnet Molding (Fifth Embodiment)

An example of an application of the metal bond magnet molding of the present embodiment is an electromagnetic device using the magnet molding of the third embodiment. The magnet molding described above can be used at high temperatures, since the magnet molding does not contain an organic binder (resin binder), and it is possible to suppress binding between the magnetic particles even when formed at high density. Therefore, it is possible to obtain a magnet molding in which both the residual magnetization (Br) and the coercive force (Hc) are improved, and, when used in an electromagnetic device, a compact, high-performance electromagnetic device can be obtained. From this standpoint, examples of an electromagnetic device using the metal bond magnet molding of the present embodiment include an on-board motor, a vehicle-mounted sensor, an actuator, and a voltage conversion device, but no limit is imposed thereby. Also, with respect to these on-board motors, and the like, it is possible to obtain a high-density magnet molding in which both the residual magnetization (Br) and the coercive force (Hc) are improved, and a compact, high-performance on-board motor, etc., can be obtained. That is, since these on-board motors and the like are systems using a magnet molding with excellent performance, it is possible to reduce the size of the system and increase the performance. A magnet motor (on-board motor, etc.) will be described below as an example of an electromagnetic device using the metal bond magnet molding of the present embodiment.

Figure 2A:
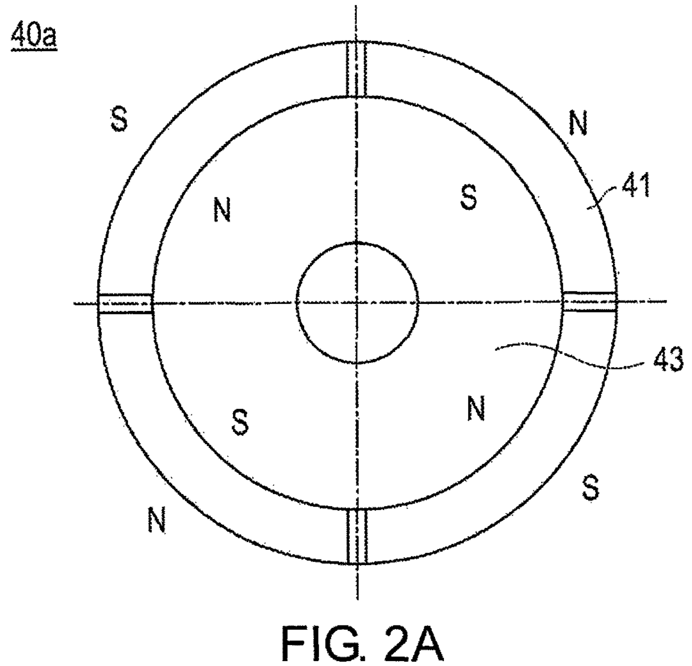
FIG. 2A is a schematic cross-sectional view of a rotor structure of a surface permanent magnet synchronous motor (SmP or SPMSm).
Figure 2B:
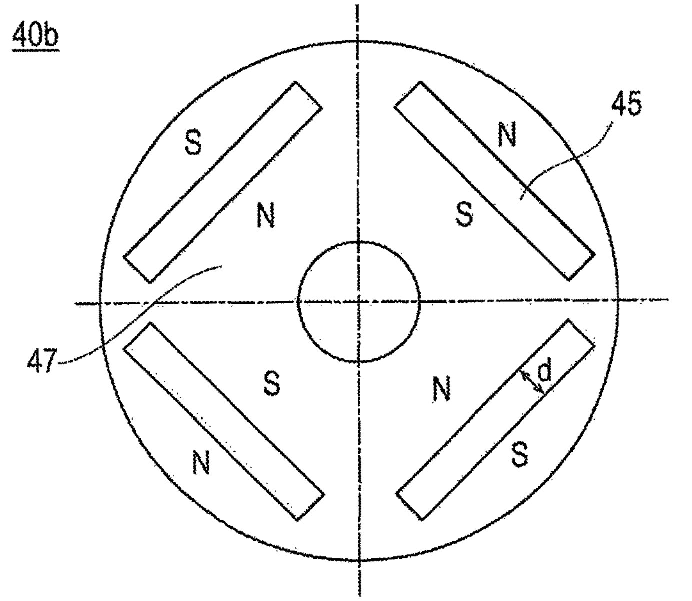
FIG. 2B is a schematic cross-sectional view of a rotor structure of an interior permanent magnet synchronous motor (IMP or IPMSm).

FIG. 2A is a schematic cross-sectional view, schematically showing a rotor structure of a surface permanent magnet synchronous motor (SmP or SPMSm). FIG. 2B is a schematic cross-sectional view of a rotor structure of an interior permanent magnet synchronous motor (IMP or IPMSm). In the surface permanent magnet synchronous motor 40*a* shown in FIG. 2A, the metal bond magnet molding of the present embodiment (simply referred to as a magnet) 41 is directly assembled (affixed) to a rotor 43 for a surface permanent magnet synchronous motor. In the surface permanent magnet synchronous motor 40*a*, a magnet 41 that is molded and solidified (and further cut, as necessary) to the desired size is assembled (affixed) to a surface permanent magnet synchronous motor 40*a*. By magnetizing this magnet 41, it is possible to obtain a surface permanent magnet synchronous motor 40*a*. In this regard, the product is said to be superior compared to an interior permanent magnet synchronous motor 40*b*. It is particularly superior in that, even when rotated at a high speed by centrifugal force, the magnet 41 does not detach from the rotor 43, and it becomes easier to use. On the other hand, in the interior permanent magnet synchronous motor 40*b* shown in FIG. 2B, the metal bond magnet molding of the present embodiment (simply referred to as a magnet) 45 is press-fitted (inserted) and fixed in an embedding groove formed in a rotor 47 for an interior permanent magnet synchronous motor. In the interior permanent magnet synchronous motor 40*b*, first, a magnet that is molded and solidified (and further cut, as necessary) to the same shape and thickness as the embedding groove (shown in the drawing) is used. In this case, it is excellent in that the shape of the magnet 45 is a flat plate shape, and that the solidification molding or the cutting of the magnet 45 is relatively easy compared to a surface permanent magnet synchronous motor 40*a*, in which it is necessary to mold a molding at the time of producing the magnet 41 on a curved surface, or to cut the magnet 41 itself.

The present embodiment is not at all limited to the specific motors described above, and may be applied to electromagnetic devices in a wide range of fields. That is, it is sufficient if the magnet has a shape corresponding to various applications over an extremely wide range of fields of devices using an Sm—Fe—N based bond magnet molding: in the consumer electronics field, such as the capstan motor of an audio device, a speaker, a headphone, a pickup of a CD, a winding motor of a camera, a focus actuator, a rotating head driving motor of a video device, a zoom motor, a focus motor, a capstan motor, an optical pickup of a DVD or Blu-ray, an air conditioner compressor, an outdoor fan unit motor, and an electric shaver motor; computer peripheral and office equipment, such as a voice coil motor, a spindle motor, an optical pickup of a CD-ROM or a CD-R, a stepper motor, a plotter, a printer actuator, a print head for a dot printer, and a rotation sensor for a copying machine; in the measurement, communication, and other precision equipment fields, such as a watch stepper motor, various meters, a vibration motor for a pager or a mobile phone (including mobile information terminals), a motor for driving a recorder pen, an accelerator, a synchrotron radiation undulator, a polarization magnet, an ion source, various plasma sources of semiconductor manufacturing equipment, for electron polarization, and for magnetic inspection bias; in the medical field, such as a permanent magnet MRI, an electrocardiograph, an electroencephalograph, a dental drill motor, a tooth fixing magnet, and a magnetic necklace; in the FA field, such as an AC servo motor, a synchronous motor, a brake, a clutch, a torque coupler, a transporting linear motor, and a reed switch; and in the automotive electronics field, such as a retarder, an ignition coil, a transformer, an ABS sensor, a rotation or a position detection sensor, a suspension control sensor, a door lock actuator, an ISCV actuator, an electric vehicle drive motor, a hybrid vehicle drive motor, a fuel cell vehicle drive motor, a brushless DC motor, an AC servomotor, an AC induction (induction) motor, a power steering, a car air conditioner, and an optical pickup of a car navigation system. However, the application in which the metal bond magnet molding of the present embodiment is used is not at all limited to only a portion of the above-described products (parts), and the metal bond magnet molding can be applied across all of the applications in which existing bond magnet moldings are currently being used.

EXAMPLES

Further details will be described below, using experimental examples and comparative examples. However, the technical scope of the present invention is not at all limited to the following experimental examples.

Experimental Example 1

(I) Preparation of Coated Magnetic Particles (1) Synthesis of Mother Alloy

Sm of 99.9% purity and Fe of 99.9% purity were dissolved and mixed in a high frequency furnace in an argon atmosphere; then molten metal was poured into a mold and cooled, and further annealed at 1250° C. for 3 hours in an argon atmosphere, to thereby prepare an alloy having a crystal structure of $Sm_2Fe_{17}$ comprising 25 wt % of Sm and 75 wt % of Fe.

(2) Coarse Pulverization

The prepared alloy was pulverized with a jaw crusher in a nitrogen atmosphere, and further coarsely pulverized to an average particle size of 100 μm with a coffee mill.

(3) Part of Coarse Pulverization (Hydrogen Storage and Hydrogen Release Treatment)+Nitriding The obtained alloy powder was placed in a tubular furnace and a hydrogen gas flow of 1.0 atm was caused to flow into the tubular furnace at 450° C. to allow hydrogen to enter the alloy powder for 30 minutes. Thereafter, at 450° C., it was switched to an Ar gas flow for 30 minutes and dehydrogenation was carried out; then at 450° C., it was switched to an $N_2$-3 vol % $H_2$ mixed gas flow to carry out nitriding for 30 minutes. Subsequently, by gradually cooling to room temperature in the mixed gas atmosphere described above, an alloy powder of $Sm_2Fe_{17}N_3$ composition was obtained.

As a result, an Sm—Fe—N alloy powder (magnet coarse powder) having an average particle size of 25 μm was obtained. The oxygen concentration was measured and found to be 0.14 wt %.

(4) Fine Pulverization+Formation of Oxygen Layer and Organic Layer+Examination

The obtained coarse powder (magnet coarse powder) was finely pulverized with a wet type bead mill LMZ 2 manufactured by Ashisawa Finetech Co., Ltd. until the average particle size became 2 μm or less. 2.5 kg of magnet coarse powder used for fine pulverization was prepared into a slurry using 3.75 kg of IPA as a solvent and 0.125 kg of methyl laurate as a lubricant, such that the magnet coarse powder constituted about 40 wt %, which was subjected to fine pulverization. The diameter of the medium used for pulverization was 1 mm, the material was PSZ (partially stabilized zirconia), and the packing rate was charged so that the weight was 75% with respect to the slurry. In the space of the container tank of the slurry, an Ar air flow was caused to flow so as not to take in the atmosphere. The pulverization was carried out while sampling was carried out every 15 minutes, and the particle diameter was observed with SEM. Since an extremely high oxidation suppression effect can be maintained during pulverization by dehydrating the water content of the solvent, it becomes possible to suppress the thickness of the oxide layer so as to remain thin, the isopropyl alcohol (IPA), which is the solvent, was adjusted to 1 wt % or less with respect to the total amount of the solvent by dehydration.

(5) Drying

After pulverizing until the average particle diameter became 2 μm or less, the organic solution on the surface of the coated magnetic particles obtained by wet milling with a bead mill was washed away with acetone and replaced with a highly volatile solution. Thereafter, the coated magnetic particles were left to stand at room temperature in an inert gas atmosphere glove box and dried. Coated magnetic particles (having two layers of an oxide layer and an organic layer coated on the surface of Sm—Fe—N magnet particles) were thereby prepared. The average particle diameter of the coated magnet particles was 1.7 μm. The dew point of the above inert gas atmosphere was adjusted to −65° C., and the oxygen concentration was adjusted to 0.002 vol %.

Figure 4B:
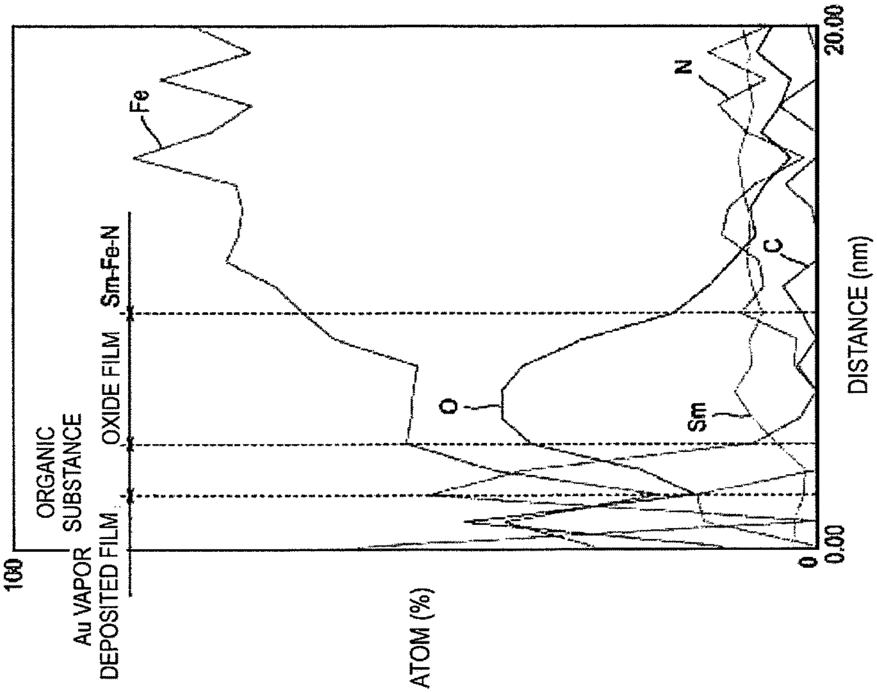
FIG. 4B is a diagram (graph on the right) illustrating the result of carrying out STEM-EDX line analysis of the surface portion of the coated magnetic particles subjected to the TEM observation in FIG. 4A.
Figure 4A:
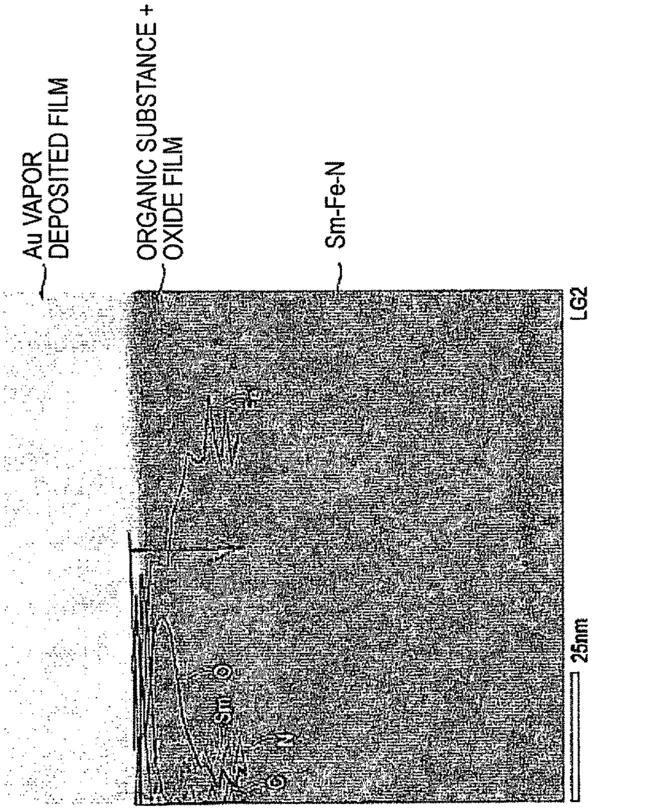
FIG. 4A is a diagram (electron micrograph on the left) illustrating the result of carrying out TEM (specifically, HAADF-STEM image) observation of the surface condition of the coated magnetic particles of Experimental Example 1.
Figure 5:
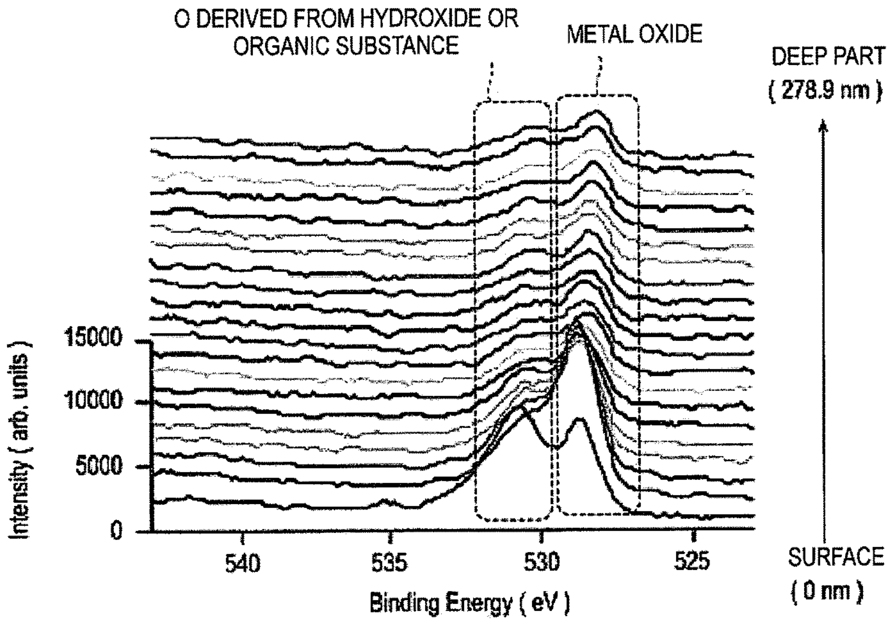
FIG. 5 is a diagram illustrating the result of XPS analysis of the surface condition of the finely pulverized coated magnetic particles of Experimental Example 1.

The surface condition of the finely pulverized and dried powder (coated magnetic particles) was observed by TEM and subjected to XPS analysis. FIG. 3 is a diagram (electron micrograph) illustrating the result obtained through a TEM observation of the surface condition of the powder (coated magnetic particles). FIG. 4A is a diagram (electron micrograph on the left) illustrating the result of carrying out a TEM (specifically, HAADF-STEM image) observation of the surface condition of the powder (coated magnetic particles). FIG. 4B is a diagram (graph on the right) illustrating the result of carrying out a STEM-EDX line analysis of the surface portion of the powder (coated magnetic particles) subjected to the TEM observation in FIG. 4A. FIG. 5 is a diagram illustrating the result of XPS analysis of the surface condition of the finely pulverized powder (coated magnetic particles). In the XPS results shown in FIG. 5, it was confirmed that the outermost surface layer contained more metal hydroxides or oxygen derived from organic substances than oxygen originating from metal oxides. Oxygen derived from metal oxides was confirmed in the intermediate layer. From the observation results in FIG. 5 and the TEM observation results shown in FIG. 3, it was confirmed that two different coatings were formed on the surface of the magnetic particles, and that two layers of an oxide layer (metal oxide layer) and an organic layer (a layer of the organic substance used as a lubricant) were formed in that order from the magnetic particle surface side. Furthermore, from the results of FIGS. 3 and 5 and the STEM-EDX line analysis result shown in FIG. 4, it was confirmed that the film thickness of the oxide layer was 4.7 nm and that the film thickness of the organic layer was 1.9 nm.

(II) Production of the Magnet Molding (1) Preparation Step

The coated magnetic particles obtained above (having two layers of an oxide layer and an organic layer coated on the surface of Sm—Fe—N magnet particles) were further processed. Zinc (Zn) particles (Kojundo Chemical Laboratory Co., Ltd.) were mixed with the coated magnetic particles as metal binder particles. The average particle diameter $D_{50}$ of the Zn particles was 3 μm. Coated magnetic particles: Zn particles were mixed in a ratio (mass ratio) of 95:5 to prepare a mixture of magnetic particles, etc. (blended powder).

(2) Preliminary Compression Molding in Magnetic Field Step 2.5 g of the mixture of magnetic particles, etc. (blended powder) was weighed, which were packed in a 7 mm×7 mm die set (rectangular mold), and a pressure of 490 MPa was applied in a magnetic field of 2 MA/m (≈25 kOe) to prepare a precompressed molding. The relative density of the precompressed molding was 65%.

(3) Hot Compaction Molding Step

After holding the obtained precompressed molding at 200° C. for 10 minutes, a pressing pressure of 3 GPa (≈30 tons/$cm^2$) molding surface pressure was applied and held for 30 seconds (bottom dead center) and subjected to hot compaction molding to obtain a magnet molding. The relative density of the obtained magnet molding was 85%. In addition, the magnetic properties of the magnet molding were measured with a BH tracer. Specifically, the magnet characteristics (coercive force, residual magnetic flux density, and maximum energy product) were measured using a pulsed excitation type magnetometer MPM-15 manufactured by Toei Industry Co., Ltd., by magnetizing a test piece of the magnet molding in advance with a magnetizing field of 10 T, and then measuring using the BH measuring instrument TRF-5AH-25Auto manufactured by Toei Industry Co., Ltd. The results are shown in Table 1.

Figure 6:
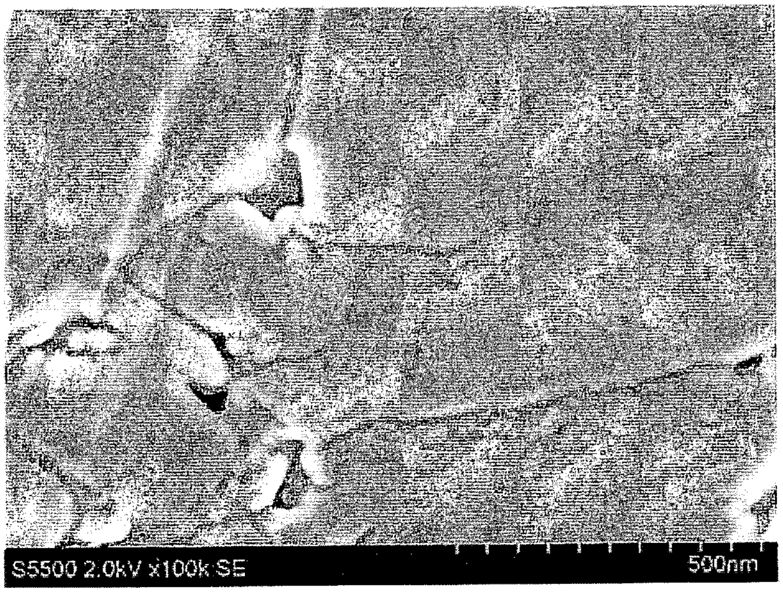
FIG. 6 is a diagram (electron micrograph) illustrating the result of carrying out a cross-sectional SEM observation of the magnet molding obtained in Experimental Example 1.
Figure 7B:
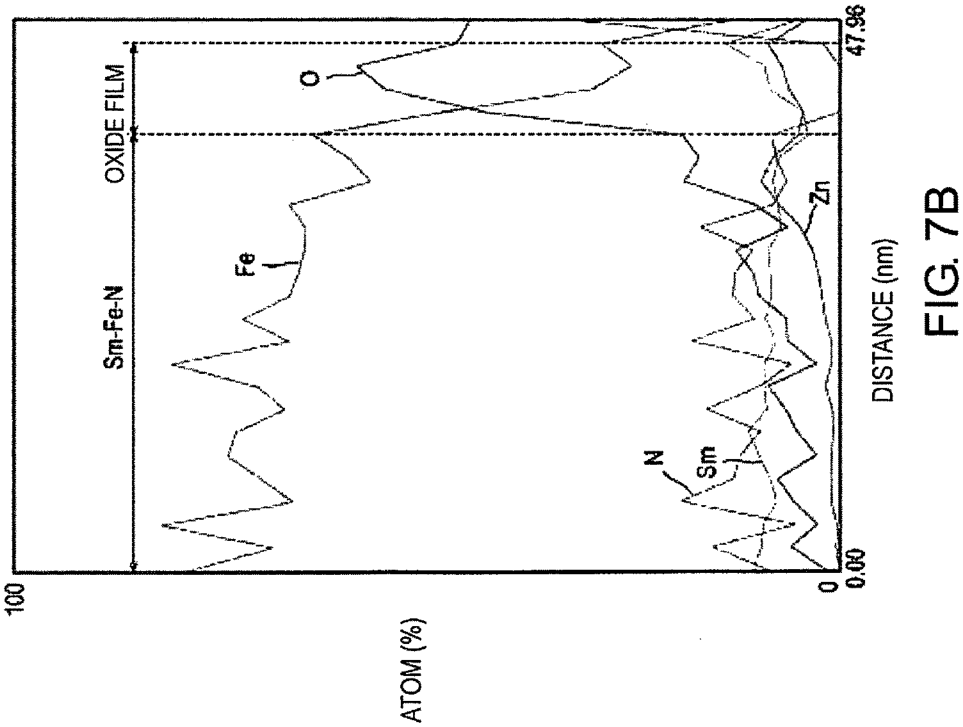
FIG. 7B is a diagram (graph on the right) illustrating the result of carrying out a cross-sectional STEM-EDX line analysis of the boundary layer portion between magnetic particles in the magnet molding subjected to the TEM observation in FIG. 7A.
Figure 7A:
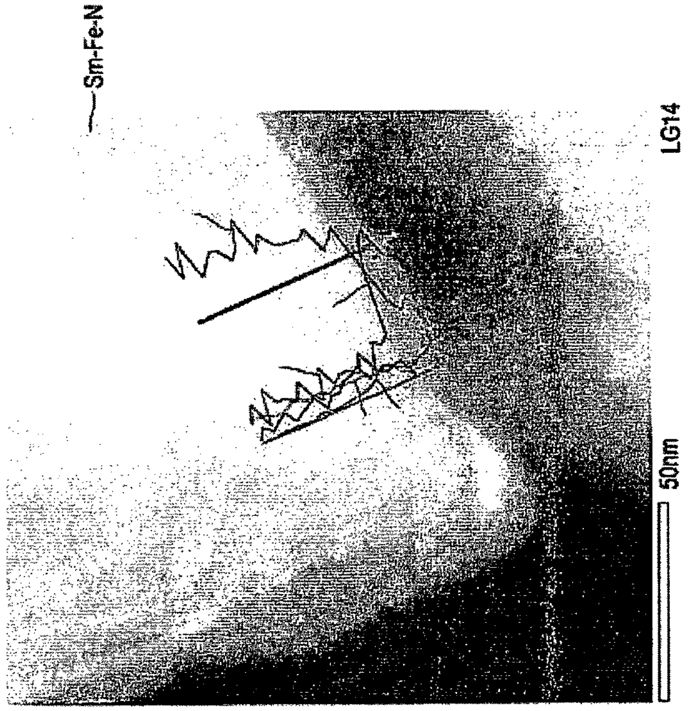
FIG. 7A is a diagram (electron micrograph on the left) illustrating the result of carrying out TEM (specifically, HAADF-STEM image) observation of the magnet molding obtained in Experimental Example 1.

FIG. 6 is a diagram (electron micrograph) illustrating the result of carrying out a cross-sectional SEM observation of the magnet molding obtained. FIG. 7A is a diagram (electron micrograph on the left) illustrating the result of carrying out a TEM (specifically, HAADF-STEM image) observation of the obtained magnet molding. FIG. 7B is a diagram (graph on the right) illustrating the result of carrying out a cross-sectional STEM-EDX line analysis on the boundary layer portion between magnetic particles in the magnet molding subjected to the TEM observation in FIG. 7A. From the cross-sectional SEM observation result shown in FIG. 6, there is clearly an intermittent boundary layer having a thickness of 1 to 20 nm between the particles of the magnetic particles. From the TEM observation results shown in FIGS. 7A and 7B, and the cross-sectional STEM-EDX line analysis results, oxides were observed in the boundary layer. The large void portions (triple point void; mainly 2 locations) in FIG. 6 are not included in the boundary layer of the magnetic particles referred to here. That is, the white lump-shaped portions in the figure are magnetic particles, and the black streak-like portions (portions appearing as cracked black lines) between the white lumps (magnetic particles) correspond to the boundary layer.

Experimental Example 2

A magnet compact body was obtained in the same manner as in Experimental Example 1, other than changing the composition of the finely pulverized slurry to 2.5 kg of magnet coarse powder, 3.6 kg of IPA, and 0.25 kg of methyl laurate. The magnetic properties of the magnet molding obtained by the BH tracer were measured in the same manner as in Experimental Example 1. The results are shown in Table 1.

Experimental Example 3

A magnet molding was obtained in the same manner as in Experimental Example 1 other than not adding Zn particles as a metal binder. The magnetic properties of the magnet molding obtained by the BH tracer were measured in the same manner as in Experimental Example 1. The results are shown in Table 1.

Comparative Example 1

A magnet molding was obtained in the same manner as in Experimental Example 1 other than not adding a lubricant at the time of pulverization.

Figure 8:
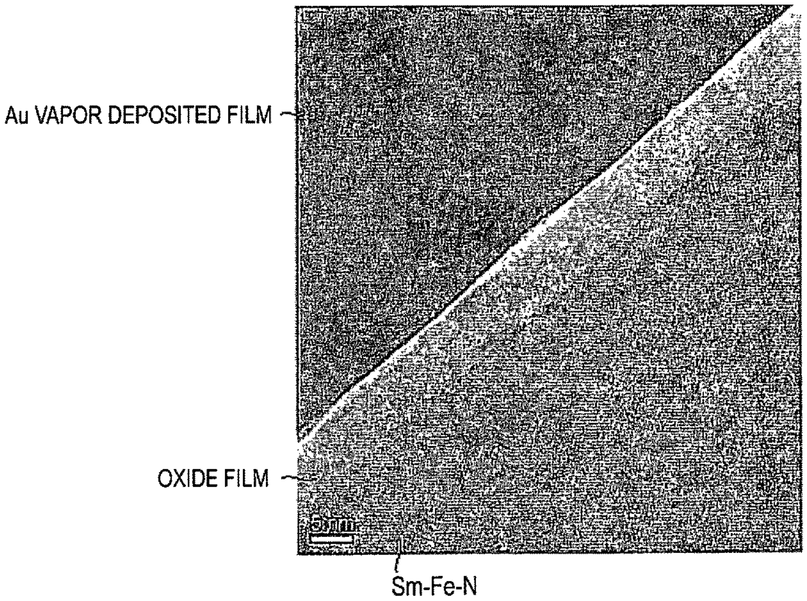
FIG. 8 is a diagram (electron micrograph) illustrating the result obtained through TEM observation of the surface condition of the coated magnetic particles used for forming the magnet molding of Comparative Example 1.

FIG. 8 is a diagram (electron micrograph) illustrating the result obtained through TEM observation of the surface condition of the coated magnetic particles used for forming the magnet molding of Comparative Example 1. From the TEM observation result shown in FIG. 8, it was confirmed that, in the coated magnetic particles of Comparative Example 1, an oxide layer was formed on the surface of the magnetic particles, but an organic layer was not observed.

Figure 9:
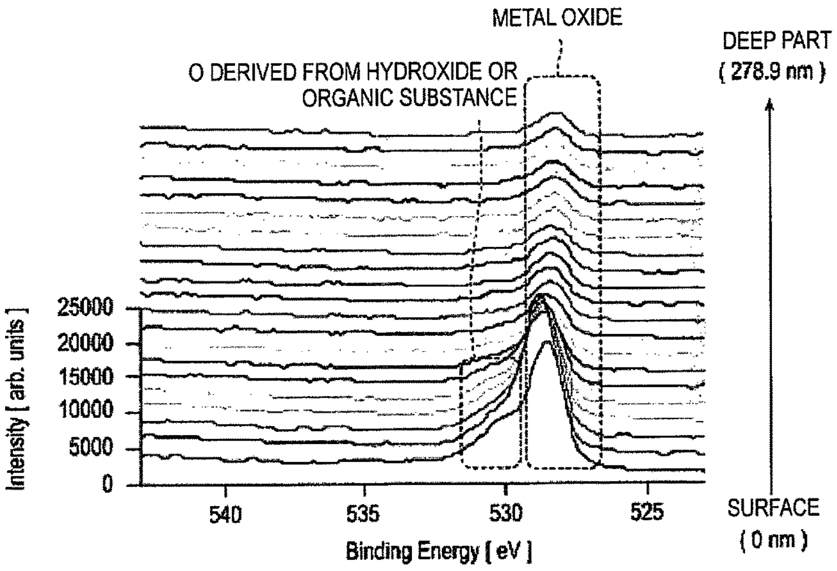
FIG. 9 is a diagram illustrating the result of XPS analysis of the surface condition of the coated magnetic particles used for forming the magnet molding of Comparative Example 1.

FIG. 9 is a diagram illustrating the result of XPS analysis of the surface condition of the coated magnetic particles used for forming the magnet molding of Comparative Example 1. In the XPS result shown in FIG. 9, it can be seen that the dominant form of oxygen present on the surface is not as an organic substance, but a metal oxide.

Figure 10:
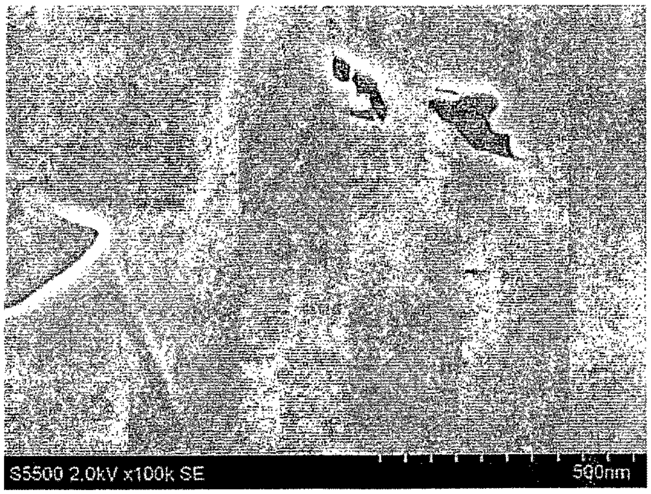
FIG. 10 is a diagram (electron micrograph) illustrating the result of carrying out a cross-sectional SEM observation of the magnet molding of Comparative Example 1.

FIG. 10 is a diagram (electron micrograph) illustrating the result of carrying out a cross-sectional SEM observation of the magnet molding of Comparative Example 1. From the cross-sectional SEM observation result shown in FIG. 10, it can be seen that the boundary layer is bound between the particles of the magnetic particles and that a clear boundary layer has disappeared from the boundary between the magnetic particles. The large void portions (triple point void; mainly 3 locations) in FIG. 10 are not included in the boundary layer of the magnetic particles referred to here. That is, although the white lump-shaped portions in the figure are magnetic particles, in FIG. 10, the black streak-like portions between white lumps (magnetic particles) as shown in FIG. 6 (portions appearing as cracked black lines) cannot be found, and it can be understood from a comparison with FIG. 6 that the boundary layer has disappeared.

The magnetic properties of the magnet molding obtained by the BH tracer were measured in the same manner as in Experimental Example 1. The results are shown in Table 1.

Comparative Example 2

A magnet molding was obtained in the same manner as in Experimental Example 1 other than not adding a lubricant, and changing the solvent to hexane, at the time of pulverization. The magnetic properties of the magnet molding obtained by the BH tracer were measured in the same manner as in Experimental Example 1. The results are shown in Table 1.

TABLE 1

| | Solvent | Lubricant | Film Thickness of Oxide Layer | Film Thickness of Organic Layer | Form of Oxygen on Surface | Metal Binder Type | Metal Binder Content Amount | Br (T) | Hc (kA/m) | BHmax (kJ/m3) |
|---|---|---|---|---|---|---|---|---|---|---|
| Experimental Example 1 | IPA | Methyl laurate | 5 nm | 2 nm | Organic Substance | Zn | 5 wt % | 1.02 | 950.00 | 185.00 |
| Experimental Example 2 | IPA | Methyl laurate | 12 nm | 10 nm | Organic Substance | Zn | 5 wt % | 0.95 | 1020.00 | 178.00 |
| Experimental Example 3 | IPA | Methyl laurate | 5 nm | 2 nm | Organic Substance | None | | 0.98 | 890.00 | 173.00 |
| Comparative Example 1 | IPA | None | 7 nm | None | Oxide | Zn | 5 wt % | 0.87 | 465.00 | 170.00 |
| Comparative Example 2 | Hexane | None | 10 nm | None | Oxide | Zn | 5 wt % | 0.82 | 520.00 | 160.00 |

As a result of analyzing the surface condition of the coated magnetic particles of each experimental example and each comparative example by XPS, when the oxygen on the surface was found to be present in the form of a metal oxide rather than an organic substance, the “Form of oxygen on surface” in Table 1 is described as “Oxide” (oxide layer); and when the form of the oxygen on the surface contained more oxygen derived from a metal hydroxide or an organic substance than oxygen derived from a metal oxide, the form is described as “Organic substance” (organic layer).

Experimental Examples 4-16

Cold Compaction Molding (I) Preparation of Coated Magnetic Particles (1) Preparation of Magnet Coarse Powder A commercially available anisotropic $Sm_2Fe_{17}N_x$ powder (x≈3) (manufactured by Sumitomo Metal Mining Co., Ltd.) having an average particle diameter $D_{50}$ of 20 μm was prepared as the Sm—Fe—N based magnet coarse powder.

(2) Fine Pulverization+Formation of Oxygen Layer and Organic Layer+Drying+Examination Other than finely pulverizing a Sm—Fe—N based magnet coarse powder using a wet type bead mill LMZ 2 manufactured by Ashisawa Finetech Co., Ltd., and changing the type and amount of added lubricant that was used as shown in Table 2, coated magnetic particles were prepared in the same manner as in Experimental Example 1 (two layers of an oxide layer and an organic layer were coated on the surface of Sm—Fe—N based magnetic particles). The type and amount of added lubricant used and the average particle diameter of the coated magnetic particles are shown in Table 2 below. Additionally, in the same manner as in Experimental Example 1, the surface condition of the coated magnetic particles was ascertained by TEM observation and subjected to XPS analysis, and the film thickness of the oxide layer and the film thickness of the organic layer were measured (refer to FIGS. 3-5).

(II) Production of the Magnet Molding (1) Preparation Step

The coated magnetic particles obtained above were further processed. The coated magnetic particles and zinc (Zn) particles (manufactured by Kojundo Chemical Laboratory Co., Ltd.) as metal binder particles were mixed in a ratio (mass ratio) of 5-10 wt % as shown in Table 2 to prepare a mixture of magnetic particles, etc. (blended powder). The average particle diameter $D_{50}$ of the Zn particles was 3 μm.

(2) Cold Compaction Molding Step 2.56 g of each of the mixtures of magnetic particles, etc. (blended powder) obtained in the above step was weighed, charged and packed into a cemented carbide die set (rectangular die) 7×7 mm square, and a pressing pressure of 3 GPa molding surface pressure was applied and held for 30 seconds (bottom dead center), cooled (room temperature; about 25° C.), and subjected to compaction molding to obtain magnet moldings. The relative densities of the obtained magnet moldings are shown in the following Table 2. The magnetic properties (coercive force) of the magnet moldings obtained in the cold compaction molding step were measured with a BH tracer in the same manner as in Experimental Example 1. The results are shown in Table 2.

(3) Heat Treatment Step

The magnet moldings obtained in the cold compaction molding step were subjected to heat treatment at a temperature of 430° C. for 30 minutes. Magnet moldings of Examples 4 to 16 were obtained by means of the steps described above. All the steps after the fine pulverization were carried out in an inert (Ar gas) atmosphere of low oxygen concentration (atmosphere) of 100 ppm or less.

The magnetic properties (coercive force) of the magnet moldings obtained in the heat treatment step were measured with a BH tracer in the same manner as in Experimental Example 1. The results are shown in Table 2.

Experimental Example 17

Hot Compaction Molding

Magnet moldings were obtained in the same manner as in Experimental Example 7 other than setting the molding surface pressure to 3.5 GPa and carrying out hot compaction molding at a molding temperature of 200° C. The relative densities of the magnet moldings obtained in the hot compaction molding step were as shown in Table 3 below. In addition, the magnetic properties (coercive force) of the magnet moldings obtained after the hot compaction molding step and after the heat treatment step were measured with a BH tracer in the same manner as in Experimental Example 1. The results are shown in Table 3.

Experimental Example 18

Hot Compaction Molding

Magnet moldings were obtained in the same manner as in Experimental Example 8 other than setting the molding surface pressure to 3.5 GPa and carrying out hot compaction molding at a molding temperature of 200° C. The relative densities of the magnet moldings obtained in the hot compaction molding step are shown in Table 3 below. In addition, the magnetic properties (coercive force) of the magnet moldings obtained after the hot compaction molding step and after the heat treatment step were measured with a BH tracer in the same manner as in Experimental Example 1. The results are shown in Table 3.

Experimental Example 19

Hot Compaction Molding

Magnet moldings were obtained in the same manner as in Experimental Example 12 other than setting the molding surface pressure to 3.5 GPa and carrying out hot compaction molding at a molding temperature of 200'C. The relative densities of the magnet moldings obtained in the hot compaction molding step are shown in Table 3 below. In addition, the magnetic properties (coercive force) of the magnet moldings obtained after the hot compaction molding step and after the heat treatment step were measured with a BH tracer in the same manner as in Experimental Example 1. The results are shown in Table 3.

TABLE 2

| | Fine Pulverization | | | | | Magnet Molding (Without Heat Treatment) | | | Magnet Molding (With Heat Treatment) |
|---|---|---|---|---|---|---|---|---|---|
| | Lubricant | Addition Amount of Lubricant (Mass) | Average Particle Diameter D50 (μm) | Organic Layer (nm) | Organic Layer (nm) | Zn Amount (Mass) | Relative Density (%) | Coercive Force (kA/m) | Coercive Force (kA/m) |
| Experimental Example 4 | Methyl laurate | 5 | 2 | 4.4 | 1.9 | 5 | 81.6 | 1010 | 1259 |
| Experimental Example 5 | Methyl laurate | 5 | 2 | 4.4 | 1.9 | 7 | 83.7 | 887 | 1182 |
| Experimental Example 6 | Methyl laurate | 5 | 2 | 4.4 | 1.9 | 10 | 85 | 1033 | 1604 |
| Experimental Example 7 | Methyl laurate | 5 | 1.7 | 4.7 | 1.9 | 5 | 82.7 | 1081 | 1390 |
| Experimental Example 8 | Methyl laurate | 5 | 1.7 | 4.7 | 1.9 | 7 | 83.5 | 969 | 1447 |
| Experimental Example 9 | Methyl laurate | 5 | 1.7 | 4.7 | 1.9 | 10 | 83.5 | 1083 | 1786 |
| Experimental Example 10 | Methyl laurate | 10 | 2 | 4.1 | 2.1 | 7 | 84.1 | 926 | 1312 |
| Experimental Example 11 | Methyl laurate | 10 | 1.7 | 4.1 | 2.1 | 7 | 84.0 | 1004 | 1359 |
| Experimental Example 12 | Methyl caproate | 0.5 | 1.7 | 6.5 | 1.0 | 5 | 81.6 | 650 | 481 |
| Experimental Example 13 | Methyl caproate | 5 | 1.7 | 5.5 | 1.3 | 5 | 81.5 | 809 | 615 |
| Experimental Example 14 | Methyl laurate | 0.5 | 1.7 | 5.4 | 1.3 | 5 | 81.6 | 813 | 624 |
| Experimental Example 15 | Methyl stearate | 0.5 | 1.6 | 5.4 | 1.3 | 5 | 81.5 | 828 | 588 |
| Experimental Example 16 | Methyl stearate | 5 | 1.8 | 7.0 | 1.3 | 5 | 82.5 | 832 | 662 |

TABLE 3

| | Fine Pulverization | | | | Magnet Molding (Without Heat Treatment) | | | Magnet Molding (With Heat Treatment) |
|---|---|---|---|---|---|---|---|---|
| | Lubricant | Addition Amount of Lubricant (Mass) | Average Particle Diameter D50 (μm) | Organic Layer (nm) | Organic Layer (nm) | Zn Amount (Mass) | Relative Density (%) | Coercive Force (kA/m) | Coercive Force (kA/m) |
| Experimental Example 17 | Methyl laurate | 5 | 1.7 | 4.7 | 1.9 | 5 | 88.8 | 783 | 1112 |
| Experimental Example 18 | Methyl laurate | 5 | 1.7 | 4.7 | 1.9 | 7 | 88.8 | 820 | 1339 |
| Experimental Example 19 | Methyl caproate | 0.5 | 1.7 | 6.5 | 1.0 | 5 | 89.6 | 646 | 560 |

"Average particle diameter" in Tables 2 and 3 is the average particle diameter of the coated magnetic particles.

From the results of Tables 2 and 3, of Experimental Examples 4-19, in Experimental Examples 4-11 and 17-18, in which methyl laurate was used as the lubricant and the addition amount thereof was 5 wt % or more, since two layers of continuous coating of an oxide layer and an organic layer were formed on the surface of the magnetic particles (core portions), it was found that the coercive force is improved by heat treatment.

On the other hand, in Experimental Examples 12-13, 15-16, and 19, which used fatty acid esters other than methyl laurate as the lubricant, and Experimental Example 14, in which the amount of added methyl laurate was set to 0.5 wt %, the coercive force was decreased by the heat treatment; therefore, it was found that in these Experimental Examples 12-16 and 19, it is sufficient to use the magnet moldings after the cold compaction molding step as the product without carrying out heat treatment.

Figure 11A:
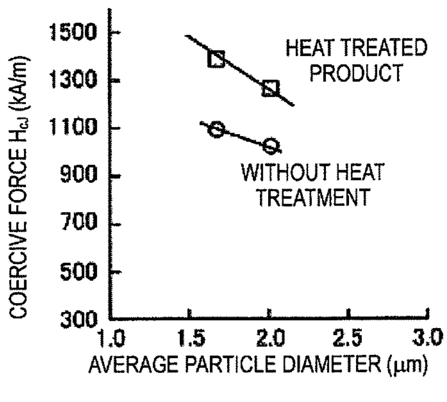
FIG. 11A is a graph illustrating the relationship between the coercive force and the average particle diameter of the coated magnetic particles of Experimental Examples 4 and 7.
Figure 11B:
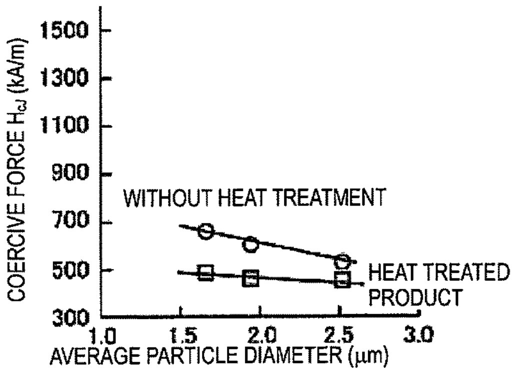
FIG. 11B is a graph illustrating the relationship between the coercive force and the average particle diameter of the coated magnetic particles of Experimental Examples 12, 20, and 21.

The relationship between the average particle diameters of the coated magnetic particles of Experimental Examples 4 and 7 and the coercive force is shown in FIG. 11A. In addition, the relationship between the coercive force and the average particle diameters of the coated magnetic particles of Experimental Example 12, Experimental Example 20 (obtained by setting the average particle diameter to 1.9 μm in Experimental Example 12), and Experimental Example 21 (obtained by setting the average particle diameter to 2.5 μm in Experimental Example 12) is shown in FIG. 11B. From FIG. 11A, it was confirmed that, when methyl laurate (addition amount 5%) is used as the lubricant, the coercive force is improved by the heat treatment, and that a magnet having a coercive force of 1200 kA/m or more can be produced (when the Zn addition amount is 5 wt %). On the other hand, from FIG. 11B, it was found that when methyl caproate is used as the lubricant, the coercive force does not improve (but, in fact, decreases) with heat treatment.

Figure 12A:
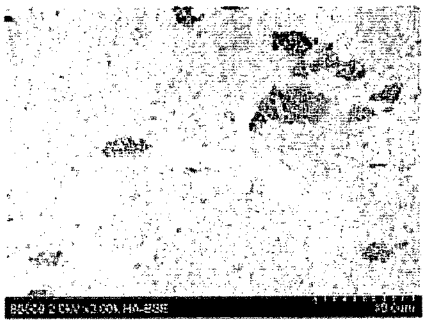
FIG. 12A is a diagram (electron micrograph) illustrating the result of carrying out SEM observation (3000×) of the magnet molding obtained in Experimental Example 7.
Figure 12B:
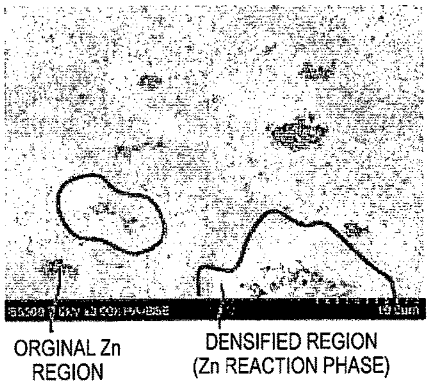
FIG. 12B is a diagram (electron micrograph) illustrating the result of carrying out SEM observation (3000×) of the magnet molding obtained in Experimental Example 12.
Figure 13:
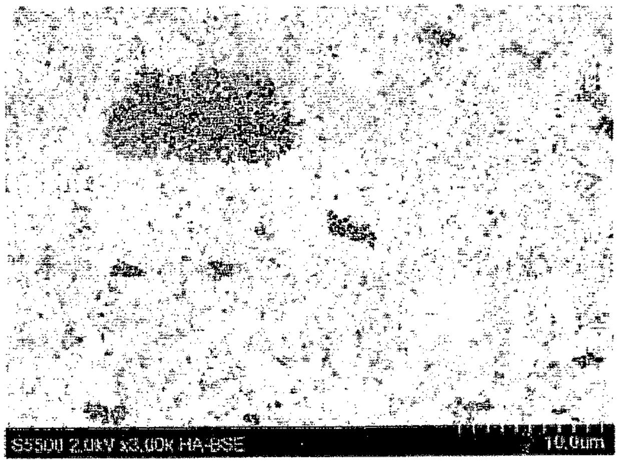
FIG. 13 is a diagram (electron micrograph) illustrating the result of carrying out SEM observation (3000×) of the magnet molding obtained in Experimental Example 7 (different field of view from that of FIG. 12A).

FIG. 12A is a diagram (electron micrograph) illustrating the result of carrying out an SEM observation (3000×) of the magnet molding obtained in Experimental Example 7. FIG. 12B is a diagram (electron micrograph) illustrating the result of carrying out an SEM observation (3000×) of the magnet molding obtained in Experimental Example 12. FIG. 13 is also a diagram (electron micrograph) illustrating the result of carrying out an SEM observation (3000×) of the magnet molding obtained in Experimental Example 7 (different field of view from that of FIG. 12A). From the SEM observation results of FIG. 12A and FIG. 13, it was confirmed that there is no densified region (white portion in the periphery distributed so as to surround a large black region (Zn) as seen in FIG. 12B). As described above, in the case of using methyl laurate as the lubricant of Experimental Example 7, zinc is diffused throughout so as to surround the Sm—Fe—N based magnetic particles by the heat treatment. It is thought that the coercive force is improved thereby. From the SEM observation results of FIG. 12B, in the case in which methyl caproate was used as the lubricant of Experimental Example 12, even when heat treatment was performed, the zinc densified region (reaction phase of Zn: the peripheral white portions distributed so as to surround the surface large black region (Zn) in the diagram) remained around the Zn, and it was confirmed that the zinc (particles) were not easily diffused uniformly due to the heat treatment. In FIG. 12B, it is considered that the coercive force did not improve because the zinc densified region (reaction phase of Zn) not observed in FIG. 12A remained.

Additionally, from the cross-sectional SEM observation results of the magnet moldings in FIG. 6 and FIG. 10, in the case that the lubricant of Comparative Example 1 was not used, magnetic particles bind to each other when producing the magnet molding (high-density compact) formed at high density in the molding step. Accordingly, it is inferred that the coercive force does not improve because it is difficult to diffuse zinc even if further heat treatment is carried out.

Figure 14A:
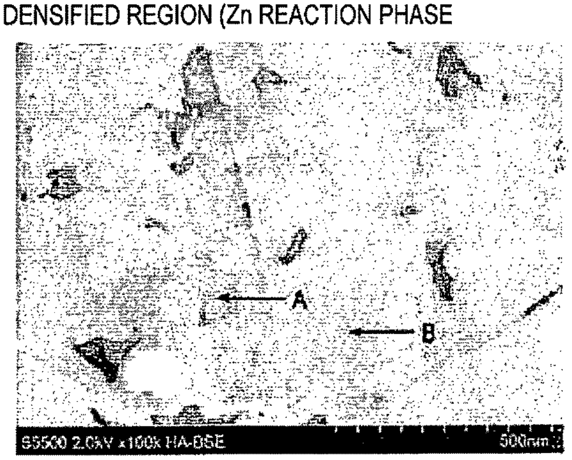
FIG. 14A is a diagram (electron micrograph) illustrating the result of carrying out an SEM observation (100,000×) of a magnet molding obtained by heat-treating the magnet molding of Experimental Example 1 in the same manner as Experimental Example 4.
Figure 14B:
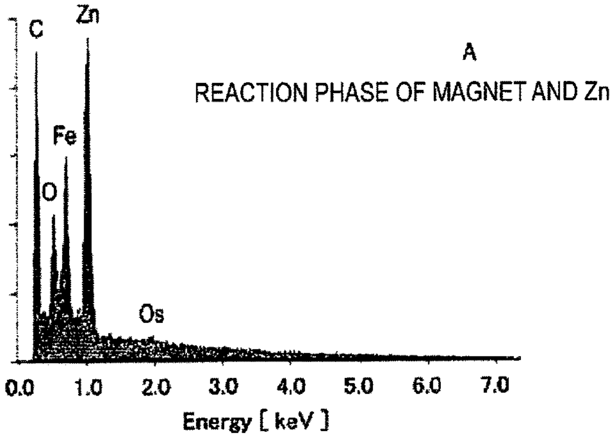
FIG. 14B is a graph illustrating the result of elemental analysis by EDX (energy dispersive X-ray spectroscopy) of the location indicated by arrow A in FIG. 14A.
Figure 14C:
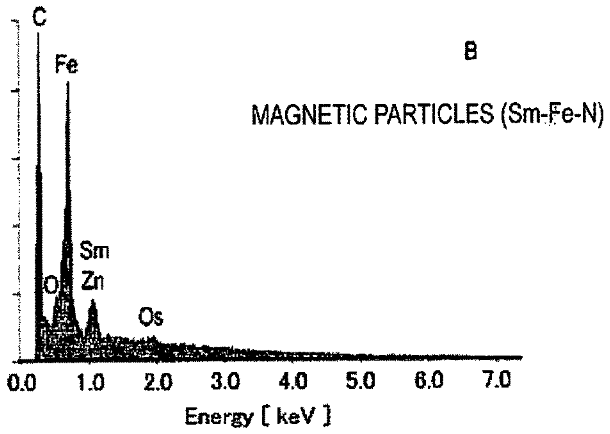
FIG. 14C is a graph illustrating the result of elemental analysis by EDX (energy dispersive X-ray spectroscopy) of the location indicated by arrow A in FIG. 14A.

On the other hand, in the case that methyl laurate is used as the lubricant of Experimental Example 1, even in a magnet molding (high-density compact body) molded at a high density in the molding step, the particles are not bound to each other, and the boundary layer between the magnetic particles is maintained. FIG. 14A is a diagram (electron micrograph) illustrating the result of carrying out an SEM observation (100,000×) of a magnet molding obtained by heat-treating the magnet molding of Experimental Example 1 in the same manner as Experimental Example 4. FIG. 14B is a graph illustrating the result of elemental analysis by EDX (energy dispersive X-ray spectroscopy) of the location indicated by arrow A in FIG. 14A. FIG. 14C is a graph illustrating the result of elemental analysis by EDX (energy dispersive X-ray spectroscopy) of the location indicated by arrow A in FIG. 14A. According to the results of the SEM observation (100,000×) and the EDX analysis of FIGS. 14A-14C, it is though that diffusion of zinc is facilitated (it can be confirmed that the black portion (Zn) in the figure is diffused (spread out)) and that the coercive force is improved by the heat treatment.

It can be seen that the region B of FIG. 14A appears particulate in form and indicates Sm Fe N magnetic particles, as illustrated in FIG. 14C. On the other hand, as illustrated in FIG. 14B, it can be seen that the dark gray region A in the gaps of the magnetic particles is the reaction phase with the Zn. That is, it is thought that Zn is diffused among the magnetic particles to form a reaction phase and penetrates while filling the voids.

The invention claimed is:

1. Coated magnetic particles comprising:

magnetic particles comprising a rare earth element;

at least two layers of an oxide layer of 1-20 nm on a surface of the magnetic particles; and an organic layer of 1-100 nm on an outer side of the oxide layer.

2. Magnetic particles recited in claim 1, wherein the organic layer is formed in a mixed solution of a fatty acid ester and an alcohol.

3. A metal bond magnet molding produced by molding with the coated magnetic particles according to claim 1.

4. The metal bond magnet molding as recited in claim 3, wherein the molding method includes die molding.

5. The metal bond magnet molding as recited in claim 3, wherein the metal bond magnet molding has a relative density of at least 50%.

6. The metal bond magnet molding as recited in claim 3, wherein the magnetic particles have a boundary layer inside the molding having a thickness of 1-20 nm and including at least one of an intermittent oxide, carbide, organic material, void, or a composite thereof.

7. The metal bond magnet molding as recited in claim 3, wherein the magnetic particles are Sm—Fe—N compounds.

8. The metal bond magnet molding as recited in claim 7, wherein the metal bond magnet molding is produced by mixing the coated magnetic particles and Zn particles blended as a metal binder to form a mixture and subjecting the mixture to solidification molding by die molding, and further subjecting to heat treatment.

9. The metal bond magnet molding as recited in claim 8, wherein a thickness of a densified region formed by a reaction product of Zn and Fe produced around the Zn binder is 5μm or less in the magnet molding.

10. The metal bond magnet molding as recited in claim 8, wherein an amount of the Zn particles is 1-15 wt % relative to a total weight of the coated magnetic particles and the Zn particles.

11. The metal bond magnet molding as recited in claim 3, wherein the metal bond magnet molding has a relative density of at least 80%.

12. An electromagnetic device using the metal bond magnet molding as recited in claim 3.

13. The electromagnetic device recited in claim 12, wherein the electromagnetic device is at least one of a vehicle-mounted sensor, an on-board motor, an actuator, and a voltage conversion device.

* * * * *